United States Patent

Takaoka et al.

[11] Patent Number: 6,157,676
[45] Date of Patent: Dec. 5, 2000

[54] DIGITAL VIDEO SIGNAL INTER-BLOCK INTERPOLATIVE PREDICTIVE ENCODING/ DECODING APPARATUS AND METHOD PROVIDING HIGH EFFICIENCY OF ENCODING

[75] Inventors: Katsumi Takaoka; Kenji Sugiyama, both of Yokosuka, Japan

[73] Assignee: Victor Company of Japan, Yokohama, Japan

[21] Appl. No.: 09/127,122

[22] Filed: Jul. 30, 1998

[30] Foreign Application Priority Data

Jul. 31, 1997 [JP] Japan .................................. 9-219994
Aug. 29, 1997 [JP] Japan .................................. 9-249770

[51] Int. Cl.[7] .............................. H04B 1/66; H04N 7/34
[52] U.S. Cl. ................................. 375/240.13; 348/409.1; 348/411.1
[58] Field of Search .......................... 375/240, 240.01, 375/240.13, 240.14, 240.17; 348/411.1, 420.1, 421.1, 409.1; 358/426.1, 261.2, 261.3, 261.4; 382/234, 236, 238, 251, 239; H04N 7/34, 1/66

[56] References Cited

U.S. PATENT DOCUMENTS

| Re. 36,507 | 1/2000 | Iu ............................................. 348/415 |
| 5,768,438 | 6/1998 | Etoh ......................................... 382/251 |
| 5,818,533 | 10/1998 | Auld et al. .............................. 348/412 |
| 5,832,124 | 11/1998 | Sato et al. ............................... 382/238 |
| 5,936,670 | 8/1999 | Frencken ................................. 348/413 |
| 5,963,673 | 10/1999 | Kodama et al. ........................ 382/239 |
| 5,973,742 | 10/1999 | Gardyne et al. ........................ 348/416 |
| 6,014,173 | 1/2000 | Miyamoto ................................ 348/416 |
| 6,028,637 | 2/2000 | Sugiyama ................................ 348/411 |
| 6,064,450 | 5/2000 | Canfield et al. ........................ 348/845 |

OTHER PUBLICATIONS

"An Image Data Compression Method Using Extrapolative Prediction–Descrete Sine Transform; in the Case of Two–Dimensional Coding" by Yamane et al; Conference on Electronic Information Communication document (B) vol. J71–B, No. 6; Jun., 1998; pp., 717–724.

*Primary Examiner*—Howard Britton
*Assistant Examiner*—Tung Vo
*Attorney, Agent, or Firm*—Lowe Hauptman Gopstein Gilman & Berner, LLP

[57] ABSTRACT

An image encoding apparatus for application to images expressed as respective frames of a digital video signal, whereby an image is converted into an array of blocks with specific blocks predetermined as being independent internally encoded blocks and the remainder as predictively encoded blocks, with predicted pixel signal values for a predictively encoded block being derived by interpolation from pixel signal values of at least one pair of blocks which have been already encoded and enclose that predictively encoded block along the row or column directions or both the row and column directions. Encoding efficiency is enhanced by applying Discrete Sine Transform processing along the interpolation direction, when encoding an array of prediction error signal values derived for a block, and by executing adaptive prediction by determining an optimum interpolation direction, when there are two possible directions for deriving predicted pixel signal values for a block.

28 Claims, 17 Drawing Sheets

FIG. 15
(A)
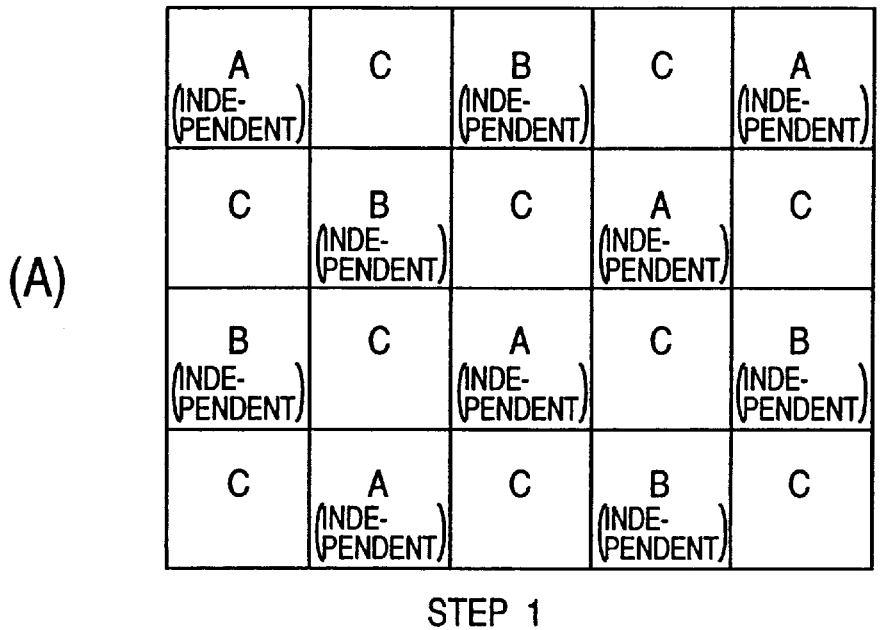
STEP 1
(B)
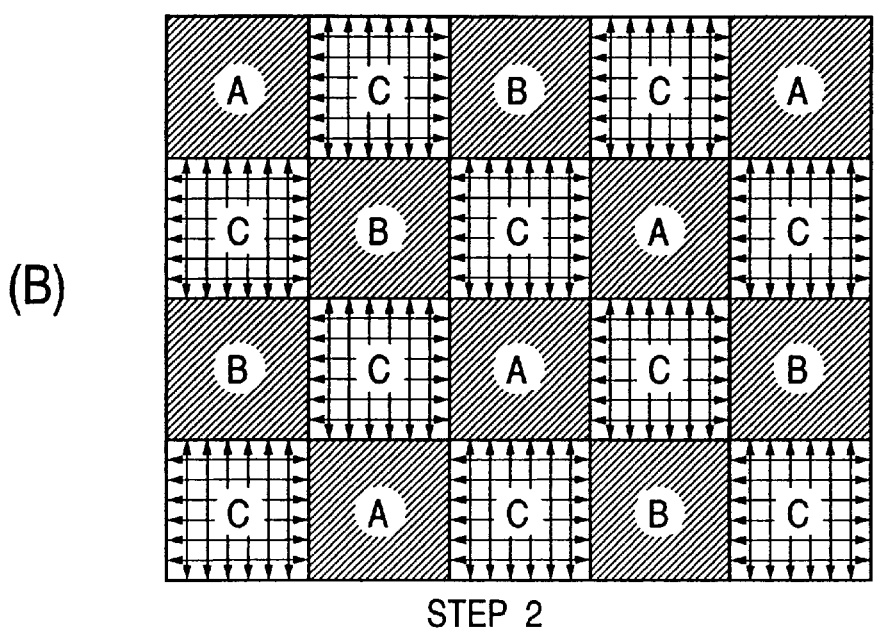
STEP 2
BLOCK REGION WHICH IS
NOT YET ENCODED ......... □
(PREDICTION BLOCK)
BLOCK REGION WHICH IS
ALREADY ENCODED ......... ▨
(INDEPENDENT BLOCK)

DIGITAL VIDEO SIGNAL INTER-BLOCK INTERPOLATIVE PREDICTIVE ENCODING/DECODING APPARATUS AND METHOD PROVIDING HIGH EFFICIENCY OF ENCODING

BACKGROUND OF THE INVENTION

1. Field of Application

The present invention relates to an image encoding apparatus and method, and corresponding decoding apparatus and method for encoding and subsequently decoding an image which is expressed as a plurality of pixels, with the operation being based upon dividing the image into a plurality of blocks of pixels and encoding/decoding these blocks.

In particular the invention relates to an inter-block interpolative prediction encoding apparatus and method, whereby the encoding efficiency is enhanced by applying inter-block interpolation to predict the pixel values of certain blocks of an image, with only resultant sets of prediction error values being encoded for such blocks.

2. Prior Art Techology

One of the basic methods of data compression which is generally applied to images which are conveyed as respective frames of a digital video signal is to process each image as a plurality of blocks of pixels, and to utilize the correlation which generally occurs within each block to reduce the amount of code which is generated, i.e. apply intra-block encoding. Usually, pixel values of each block are subjected to DCT encoding, followed by quantization of the DCT coefficients and variable-length encoding, to thereby achieve a substantial degree of data compression.

However methods of inter-block encoding have also been proposed for utilizing the correlation which often exists between adjacent blocks, i.e., methods whereby blocks of an image are encoded based on pixel values of adjacent blocks which have already been encoded. An example of such a method is described in a paper entitled "An Image Data Compression Method using Extrapolative Prediction—Discrete Sine Transform; in the case of Two-Dimensional Coding", Conference on Electronic Information Communication document (B).J 71-No. 6 pp 717–724 (July, 1988, in Japan).

The basic principles of such a method are illustrated in the diagram of FIG. 18 showing part of a block-divided image which is being encoded, in which the cross-hatched region 301 consists of respective blocks which have already been encoded, while the blank region 300 consists of blocks which are yet to be encoded. Numeral 302 denotes a block which is currently being encoded, by extrapolative prediction based on pixel values of two adjacent blocks 303, 304 which have already been encoded.

FIG. 16 is a general system block diagram showing an example of a prior art type of intra-block predictive encoding apparatus which utilizes the principles described in the above reference. In the following description, video signal values expressing pixels, and prediction error signal values, etc. will be simply referred as pixel values, prediction error values, etc., for brevity of description. In FIG. 16, a raster-scan digital video signal is applied from an input terminal 1 to a block conversion section 51, in which each part of the video signal corresponding to an image is divided into a plurality of sets of pixel values corresponding to respective blocks of pixels, which are supplied to one input of a prediction subtractor 4. The prediction subtractor 4 subtracts from each pixel value a corresponding predicted value, to thereby obtain a prediction error value, which is input to an encoding section 52. As described in the above reference document, it is preferable for the encoding section 52 to apply DST (Discrete Sine Transform) processing rather than DCT processing when encoding the prediction error values which are obtained for respective pixels of a block by extrapolative prediction. For that reason, the set of prediction error values which are derived for a block are subjected to DST processing, followed by quantization of the resultant DST coefficients, and variable-length encoding. The resultant code is supplied to the output terminal 7, and also is input to the decoding section 55. The prediction error values which have thereby been encoded by the encoding section 52 are successively recovered through decoding processing which is applied by the decoding section 55. Each reconstructed prediction error value thus obtained is supplied to one input of a prediction adder 17. A predicted value for that pixel is generated at that time by the block prediction section 53 (based on reconstructed pixel values for adjacent pixels, read out from the block line memory 54) and supplied to the other input of the prediction adder 17, which thereby outputs a reconstructed pixel value for the pixel which is being processed. That reconstructed pixel value is stored in the block line memory 54.

The block line memory 54 stores the pixel values thus derived in units of blocks, as can be understood from FIG. 18, i.e. pixel values for successive rows of blocks are sequentially derived and stored in the block line memory 54, so that pixel values which are required for processing the block that is currently being encoded will always be available from the block line memory 54 when required.

FIG. 17 is a general system block diagram of an inter-block extrapolative prediction decoding apparatus corresponding to the inter-block extrapolative prediction encoding apparatus of FIG. 16. In FIG. 17, the input code stream is supplied via input terminal 21 to a decoding section 55, in which encoding including inverse DST processing is executed, to thereby recover respective prediction error values for the pixels of an image. Each such prediction error value is added in the prediction adder 17 to an inter-block prediction value for that pixel, which is generated by the block prediction section 53, to thereby obtain reconstructed pixel values. These pixel values are supplied to a raster conversion section 61 and to a block line memory 54. The raster conversion section 61 executes processing which is the inverse of that executed by the block conversion section 51 of FIG. 16, to thereby convert the pixel values from being arranged in units of blocks into a usual type of raster-scan video signal, which is supplied to an output terminal 24. The operation of the block line memory 54 and of the block prediction section 53 is identical to that of the encoding apparatus of FIG. 16, with reconstructed pixel values being stored in the block line memory 54 as successive rows of blocks, with appropriate reconstructed pixel values being read out from the block line memory 54 and supplied to the block prediction section 53 as required for deriving each predicted pixel value.

Such a method of inter-block encoding can provide higher encoding efficiency than is achieved by internally encoding all of the blocks of an image mutually independently. However it is difficult for such a method, based on extrapolation, to generate predicted pixel values which will accurately follow variations in the contents of an image. Furthermore such a method is entirely recursive, so that all of the predicted pixel values which are derived for a block (and hence, the resultant prediction error values which are encoded and transmitted) are based upon pixel values of adjacent blocks which have already been encoded, as illustrated by the arrow lines in block 302 of FIG. 18, with the latter pixel values being similarly dependent upon pixel values of preceding blocks. As a result, if an error arises in the code which is generated by the apparatus, i.e., an error occurring during transmission/receiving or recording/reproduction of the code, then at the time of decoding the received or reproduced code, the effects of such an error will propagate from the block in which the error occurs into all of the blocks which are subsequently decoded. Thus, even a low rate of occurrence of code errors can have a considerable adverse effect upon the resultant displayed video image.

The above problems arise from the fact that the encoding of an image occurs as a continuous flow in which each of the predicted pixel values is derived from reconstructed pixel values each of which has been derived from a predicted pixel value that was derived from reconstructed pixel values, and so on, with the operation being purely recursive. The problems also arise due to the fact that the prediction is extrapolative, being based upon pixel values of two adjacent blocks which are located along only two adjacent sides of the block which is being encoded. Thus for example in the case of the block 302 shown in FIG. 18, if the general level of the pixel values in the block 305 is substantially higher than that of the pixel values of block 304 and/or 303 (i.e., due to a sudden change in brightness level within the image), that fact will have no effect upon the predicted pixel values which are derived for the block 302 by the extrapolative prediction process. Thus, a method which would provide improved prediction accuracy is desirable.

SUMMARY OF THE INVENTION

It is an objective of the present invention to overcome the disadvantages of the prior art set out above, by providing an inter-block interpolative prediction encoding apparatus and corresponding inter-block interpolative prediction decoding apparatus, and an inter-block interpolative prediction encoding method and corresponding inter-block interpolative prediction decoding method in which a specific proportion of the blocks of an image are independently internally encoded (such blocks being referred to in the following description and claims as the independent blocks), with the remaining blocks of the image (such blocks being referred to herein as the prediction blocks) being predictively encoded by using interpolated predicted pixel values which are derived either directly or indirectly from pixel values of independent blocks within that image.

As a first basic feature of the invention, the predicted pixel values for each of a first set of the prediction blocks can be derived by interpolation between pixel values of an encoded independent block and of a region of blocks which have already been encoded (i.e., a continuously extending region consisting of encoded independent blocks and encoded prediction blocks, which is successively expanded as encoding of the image proceeds), while each predicted pixel value for each of the remaining prediction blocks is derived as a combination of two values derived by interpolation in the row and column directions respectively of the image, between pixel values of the two most recently encoded ones of the first set of prediction blocks and pixel values of the aforementioned already encoded region. Upon completion of such operations on three mutually adjacent prediction blocks based on the pixel values of an adjoining encoded independent block, with the region of already encoded blocks having been thereby expanded by four blocks (e.g., along the row direction of the image), a succeeding encoded independent block which is spaced apart from the already encoded region by one block in the row and column directions is utilized for repeating that sequence of operations to encode a further set of three mutually adjacent prediction blocks, to thereby further expand the already encoded region. That sequence of operations is successively repeated until the entire image has been encoded.

As a second basic feature of the invention, adaptive prediction may be performed. Rather than deriving each predicted pixel value for each of the aforementioned remaining prediction blocks as a combination of two values derived by interpolation in the row and column directions respectively of the image, a set of predicted pixel values derived by interpolation along the column direction and a set of predicted pixel values derived by interpolation along the row direction can be respectively obtained for such a prediction block, and a judgement can then made as to which of these two directions of interpolation will result in the smaller amount of code being generated (i.e. when resultant prediction error values are encoded, such as by DCT processing, quantization, and variable-length encoding in the usual manner). The set of prediction error values which will result in generation of the smaller amount of code can then selected to be encoded and output from the apparatus.

As a third basic feature of the invention, for improved encoding efficiency, when a set of prediction error values for a prediction block have been derived based on interpolated predicted pixel values which are obtained by interpolation along a specific (row or column) direction, that set of prediction error values is encoded by using one-dimensional DST (Discrete Sine Transform) processing along that interpolation direction, and using one-dimensional DCT (Discrete Cosine Transform) processing along the direction perpendicular to the interpolation direction. When a set of prediction error values for a prediction block have been derived based on predicted pixel values each of which is a combination of two values obtained by interpolation along the row and column directions respectively, then that set of prediction error values is encoded by using orthogonal DST processing.

As a fourth basic feature of the invention, encoding of an image can be performed by dividing the image into an array of blocks, assigning alternate ones of respective blocks along each row and alternate ones of respective blocks along each column of that array as independent blocks, and assigning the remaining blocks as prediction blocks (so that each prediction block is enclosed between a set of four independent blocks) encoding all of the independent blocks, and obtaining and storing respective sets of resultant reconstructed pixel values for each of the encoded independent blocks, then using these reconstructed pixel values to encode each of the prediction blocks. Since each prediction block is enclosed at top and bottom and right and left sides thereof between encoded independent blocks, a set or predicted pixel values can be derived for each prediction block from interpolated values which are obtained by interpolation along the row direction and the column direction respectively, using pixel values of the enclosing independent blocks. Each predicted pixel value for a prediction block can thus be derived as a combination of two interpolated values, as described above. Alternatively, complete sets of predicted pixel values for the case of interpolation along the row direction and along the column direction respectively can be derived for a prediction block, and a judgement made as to which of these will result in a set of prediction error values that will generate the smallest amount of code when encoded, as described above.

As a result, the present invention can provide an inter-block interpolative prediction encoding apparatus (and corresponding inter-block interpolative prediction decoding apparatus) which is capable of high encoding efficiency, through the use of inter-block interpolative prediction of pixel values within an image. Encoding efficiency can be further enhanced, when encoding an array of prediction error values which have been derived by adaptive prediction, i.e. based on interpolation along a specific direction, by applying one-dimensional DST processing to the array of prediction error values along the interpolation direction when encoding the prediction error values.

With the present invention, due to the periodic provision of independently internally encoded blocks in an image, it can be ensured that the effects of any code error, at the time of decoding, will not propagate beyond, at most, one or two blocks which are adjacent to the block in which an error arises.

According to one aspect, the invention provides an inter-block interpolative prediction encoding apparatus for dividing an image into block units, and executing sequential encoding processing, comprising:

first encoding means for deriving code by independent intra-block encoding of an independent block which is separate from blocks which have already been encoded, and for executing local decoding of said code to obtain a decoded image, first prediction means for generating first interpolative prediction signal values for respective pixels within first prediction blocks, from decoded images of said blocks which have already been encoded and of said independent block, said first prediction blocks being sandwiched at the top and bottom or to the left and right between said blocks which have already been encoded and said independent block, second encoding means for deriving code by encoding prediction error signal values which are obtained by subtracting said first interpolative prediction signal values from respective values of said pixels within said first prediction blocks, and for executing local decoding of said code to obtain decoded images, second prediction means for generating respective second interpolative prediction signal values for pixels within a second prediction block, from decoded images of blocks which have already been encoded and are located above and below or to the left and the right of said second prediction block and from said decoded images of said first prediction blocks, said second prediction block being sandwiched at top and bottom and to the left and right between said blocks which have already been encoded and said first prediction blocks, and third encoding means for subtracting said second interpolative prediction signal values from respective values of pixels within said second prediction block, to obtain prediction error signal values, and for encoding said prediction error signal values.

The encoding and decoding of a prediction block which are executed within such an apparatus are preferably executed in accordance with a direction in which interpolative prediction is applied to that block, i.e., with one-dimensional Discrete Sine Transform processing being applied along the vertical direction and one-dimensional Discrete Cosine Transform processing being applied along the horizontal direction, in the case of interpolative prediction along the vertical direction, and with one-dimensional Discrete Sine Transform processing being applied along the horizontal direction and one-dimensional Discrete Cosine Transform processing being applied along the vertical direction in the case of interpolative prediction along the horizontal direction.

The invention further provides a corresponding inter-block interpolative prediction decoding apparatus for dividing an image into block units, and executing sequential decoding processing, comprising:

first decoding means for deriving a decoded image by independent intra-block decoding of an independent block which is separated from blocks which have already been encoded, first prediction means for generating first interpolative prediction signal values for respective pixels of first prediction blocks from decoded images of said blocks which have been already decoded and of said independent block, where each of said first prediction blocks is sandwiched at the top and bottom, or to the left and right, between said decoded blocks and said independent block, second decoding means for decoding respective prediction error signal values for pixels of the first prediction block, to obtain decoded prediction error signal values, and adding said decoded prediction error signal values to respective ones of said first interpolative prediction signal values to thereby obtain decoded images, second prediction means for generating second interpolative prediction signal values for respective pixels of a second prediction block from decoded images of said blocks which have already been decoded and from said decoded images of said first prediction blocks, said second prediction block being sandwiched at top and bottom and to the left and right between said blocks which have already been decoded and said first prediction blocks, and third decoding means for decoding prediction error signal values for said second prediction block, to obtain decoded prediction error signal values, and for adding said decoded prediction error signal values to respective ones of said second interpolative prediction signal values to obtain a decoded image.

With such a decoding apparatus too, decoding of a prediction bis preferably executed in accordance with a direction in which interpolative prediction is applied to that block, with one-dimensional Discrete Sine Transform processing being applied along the vertical direction and one-dimensional Discrete Cosine Transform processing being applied along the horizontal direction, in the case of interpolative prediction along the vertical direction, and with one-dimensional Discrete Sine Transform processing being applied along the horizontal direction and one-dimensional Discrete Cosine Transform processing being applied along the vertical direction in the case of interpolative prediction along the horizontal direction.

The invention correspondingly provides a method of inter-block interpolative prediction encoding for dividing an image into block units, and executing sequential encoding processing, comprising:

deriving a first code by independent intra-block encoding of an independent block which is separated from blocks which have already been encoded, and for executing local decoding of said code to obtain a decoded image, generating respective first interpolative prediction signal values for respective pixels of first prediction blocks, from decoded images of said blocks which have already been encoded and said independent block, said first prediction blocks each being sandwiched at top and bottom or to the left and right between said blocks which have already been encoded and said independent block, deriving a second code by encoding prediction error signal values which are obtained by subtracting said first interpolative prediction signal values from respective values of said pixels of said first prediction blocks, executing local decoding of said second code to obtain decoded images, generating respective second interpolative prediction signal values for pixels of a second prediction block, from decoded images of said blocks which have already been encoded, said second prediction block being sandwiched at top and bottom and to the left and right between said blocks which have already been encoded and said first prediction blocks, subtracting said second interpolative prediction signal values from respective values of said pixels of second prediction block, to obtain corresponding prediction error signal values, and encoding said prediction error signal values to obtain a third code.

According to another aspect, the invention provides an inter-block interpolative prediction decoding method for dividing an image into block units, and executing sequential decoding processing, comprising:

deriving a first decoded image by independent intra-block decoding of an independent block which is separated from blocks which have already been decoded, generating respective first interpolative prediction signal values for pixels of first prediction blocks, from decoded images of said blocks which have already been decoded and of said independent block, each of said first prediction blocks being sandwiched at top and bottom or to the left and right between said blocks which have already been encoded and said independent block, decoding respective prediction error signal values of the first prediction blocks, to obtain decoded prediction error signal values, and adding said decoded prediction error signal values to corresponding ones of said first interpolative prediction signal values to obtain second decoded images, generating respective second interpolative prediction signal values for pixels of a second prediction block, from decoded images of said blocks which have already been decoded and from said decoded images of said first prediction blocks, said second prediction block being sandwiched at top and bottom and to the right and left between said blocks which have already been decoded and said first prediction blocks, decoding respective prediction error signal values for pixels of said second prediction block, to obtain decoded prediction error signal values, and adding said decoded prediction error signal values to said second interpolative prediction signal values to obtain a third decoded image.

According to another aspect, the invention provides an inter-block adaptive interpolative prediction encoding apparatus for dividing an image into units of blocks, executing independent internal encoding of part of said blocks and encoding remaining ones of said blocks by inter-block prediction, the apparatus comprising first encoding means for executing encoding of blocks which are disposed at the top and bottom and to the right and left of respective adaptive prediction blocks which constitute part or all of said prediction blocks, to obtain resultant code, and for executing decoding of said code to obtain respectively decoded images, adaptive subtractor means for judging an appropriate prediction direction, based upon said decoded images of said blocks disposed at the top and bottom and to the right and left of said adaptive prediction block, for thereby deriving, for each pixel within said adaptive prediction block, a vertical interpolative prediction signal value based on said decoded images of said blocks disposed at the top and bottom, and a horizontal interpolative prediction signal value based on said decoded images of said blocks disposed to the right and left, selecting one of said interpolative prediction signal values based upon results of said judgement of prediction direction, subtracting each said interpolative prediction signal value from a corresponding value of a pixel within said adaptive prediction block to obtain a prediction error signal value, and second encoding means for executing encoding of said prediction error signal values to obtain resultant code.

With such an inter-block adaptive interpolative prediction encoding apparatus, all of said prediction blocks may be predetermined as adaptive prediction blocks, with said adaptive prediction subtractor means comprising prediction means for deriving, for each pixel of an adaptive prediction block which is sandwiched at top and bottom and left and right sides thereof between respective ones of said independent blocks, a vertical interpolative prediction signal value from said decoded images of said independent blocks disposed to the top and bottom and a horizontal interpolative prediction signal value from said decoded images of said independent blocks disposed to the left and right sides, prediction subtractor means for subtracting each said vertical interpolative prediction signal value from a corresponding value of a pixel within said adaptive prediction block to thereby obtain a corresponding vertical prediction error signal value, and for subtracting each said horizontal interpolative prediction signal value from a corresponding value of a pixel within said adaptive prediction block to thereby obtain a corresponding horizontal prediction error signal value, and encoding efficiency judgement means for estimating respective encoding efficiencies for said vertical prediction error signal values and said horizontal prediction error signal values and selecting the prediction error signal values which will result in generation of a smaller amount of code.

Furthermore, such an inter-block adaptive interpolative prediction encoding apparatus may be configured such that each said independent block is disposed separated from blocks which have already been encoded, and said prediction blocks consists of non-adaptive prediction blocks each of which is sandwiched at top and bottom or to the right and left between said blocks which have already been encoded and said independent blocks and of adaptive prediction blocks each of which is sandwiched at top and bottom and to the right and left between said blocks which have already been encoded and said independent blocks.

According to another aspect, the invention provides an inter-block interpolative prediction decoding apparatus for performing independent block predictive decoding of an image which has been encoded by being divided into block units, with part of the blocks being independent blocks which are independently internally encoded and remaining blocks being prediction blocks which are predictively encoded, the apparatus comprising first decoding means for executing decoding of blocks disposed at top and bottom and left and right sides of each of respective adaptive prediction blocks which constitute part or all of said prediction blocks, prediction judgement means for estimating a prediction direction for each of said adaptive prediction blocks, to obtain judgement information, prediction means for deriving an interpolative prediction signal value for each pixel within said adaptive prediction block by selecting, based on said judgement information, either a vertical interpolative prediction signal value obtained using decoded images of said blocks at top and bottom or a horizontal interpolative prediction signal value obtained using decoded images of said blocks at left and right, and second decoding means for executing decoding of prediction error signal values of said adaptive prediction block to obtain decoded prediction error signal values, and adding said decoded prediction error signal values to said interpolative prediction signal values to obtain a decoded image.

Such an inter-block interpolative prediction decoding apparatus may be configured such that each said independent block is separated from blocks which have already been encoded and said prediction blocks consist of non-adaptive prediction blocks each sandwiched at top and bottom or to the right and left sides between said blocks which have already been decoded and said independent blocks, and adaptive prediction blocks each sandwiched at top and bottom and to the left and right sides between said blocks which have already been decoded and said independent blocks.

BRIEF DESCRIPTION OF THE DRAWINGS

FIG. 15 is a conceptual diagram for use in describing the process of deriving predicted pixel values for each of respective prediction blocks, by interpolation from adjacent independent blocks, with the embodiment of FIG. 13;

DESCRIPTION OF PREFERRED EMBODIMENTS

Figure 1:
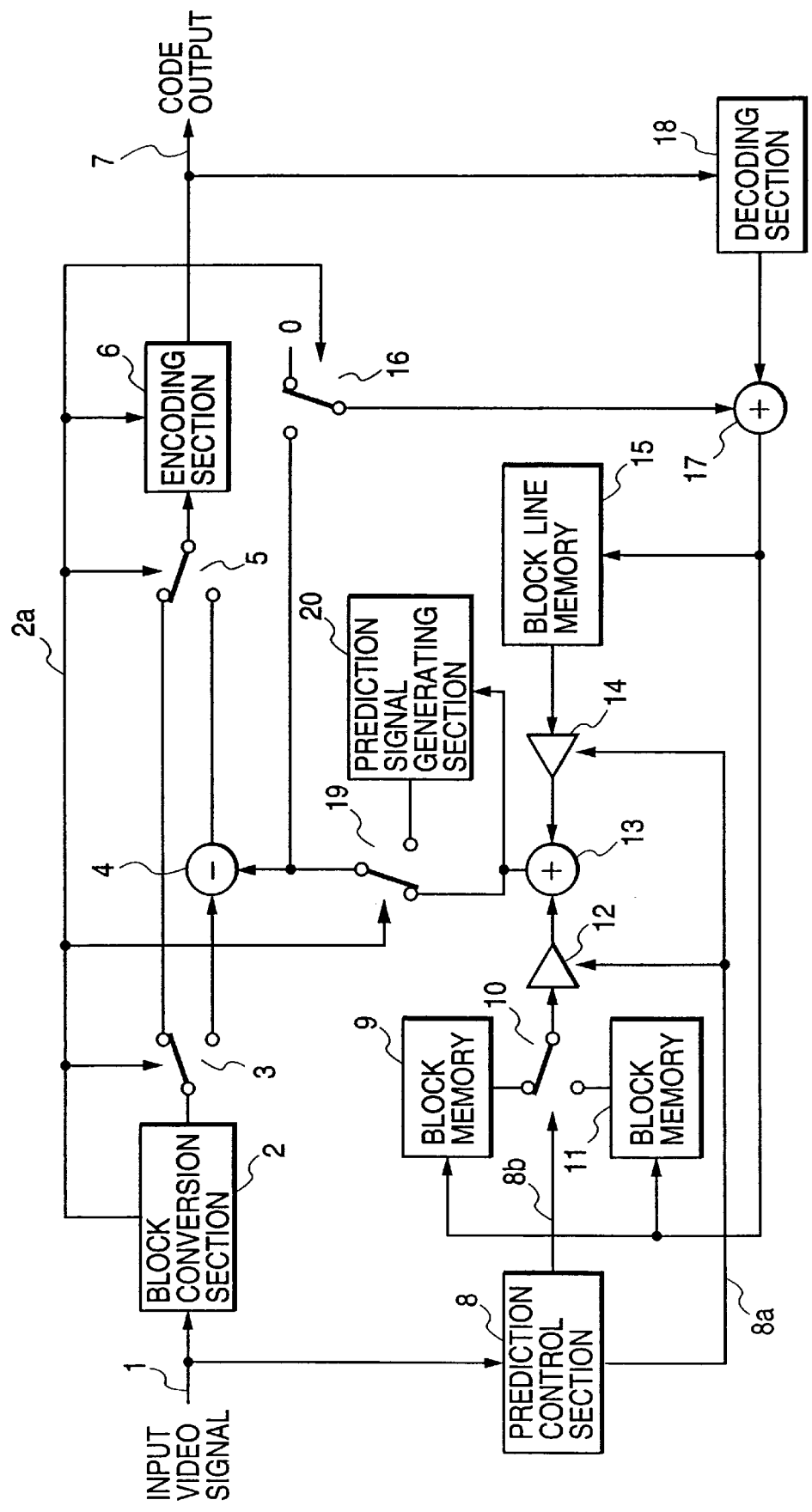
FIG. 1 is a general system block diagram of a first embodiment of an inter-block interpolative prediction encoding apparatus according to the present invention.
Figure 16:
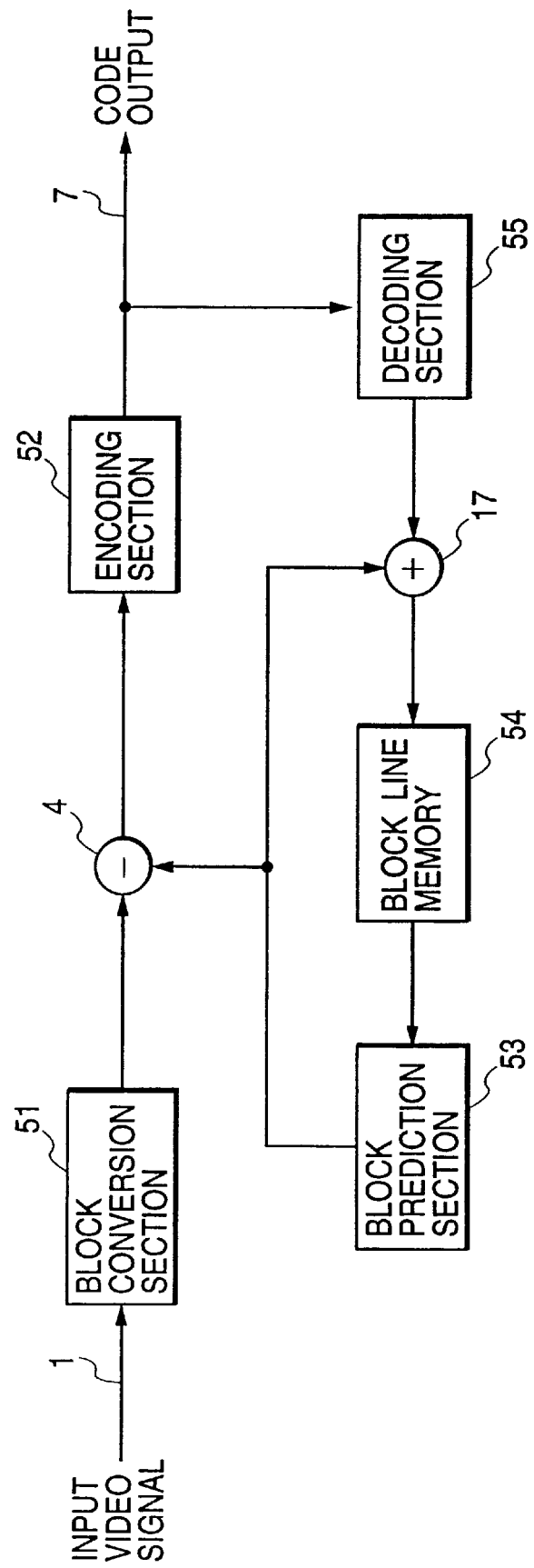
FIG. 16 is a general system block diagram of an example of a prior art type of inter-block extrapolative prediction encoding apparatus.

A first embodiment of an inter-block interpolative prediction encoding apparatus according to the present invention will be described referring to the general system block diagram of FIG. 1. In FIG. 1, a usual type of raster-scan digital video signal is supplied to an input terminal 1, and resultant code is supplied to an output terminal 7. A subtractor 4 and prediction adder 17 perform basically the same functions as the correspondingly designated components in the prior art example of FIG. 16 described above. In addition, this embodiment includes a block conversion section 2, switches 3, 5, 10 and 16, and encoding section 6, block memories 9, 11 and a block line memory 15, multipliers 12 and 14 and adder 13, a prediction signal generating section 20, and prediction control section 8 and an decoding section 18. The operation of each of the block conversion section 2, the encoding section 6, the prediction control section 8 and the decoding section 18 differs substantially from that of the block conversion section 51, the encoding section 52, the block prediction section 53 and the block conversion section 55 respectively of the prior art example of FIG. 16 described above.

The switches 3, 5 and 19 are controlled by control signals 2a generated by the block conversion section 2, which also synchronize the operation of the encoding section 6 with that of the switches 3, 5. The operation of the switch 10, as well as respective multiplication factors which are implemented by the multipliers 12, 14 are controlled by control signals 8b, 8a which are generated by the prediction control section 8. The prediction control section 8 also controls data read and write operations of the block memories 9, 11 and the block line memory 15.

Figure 3:
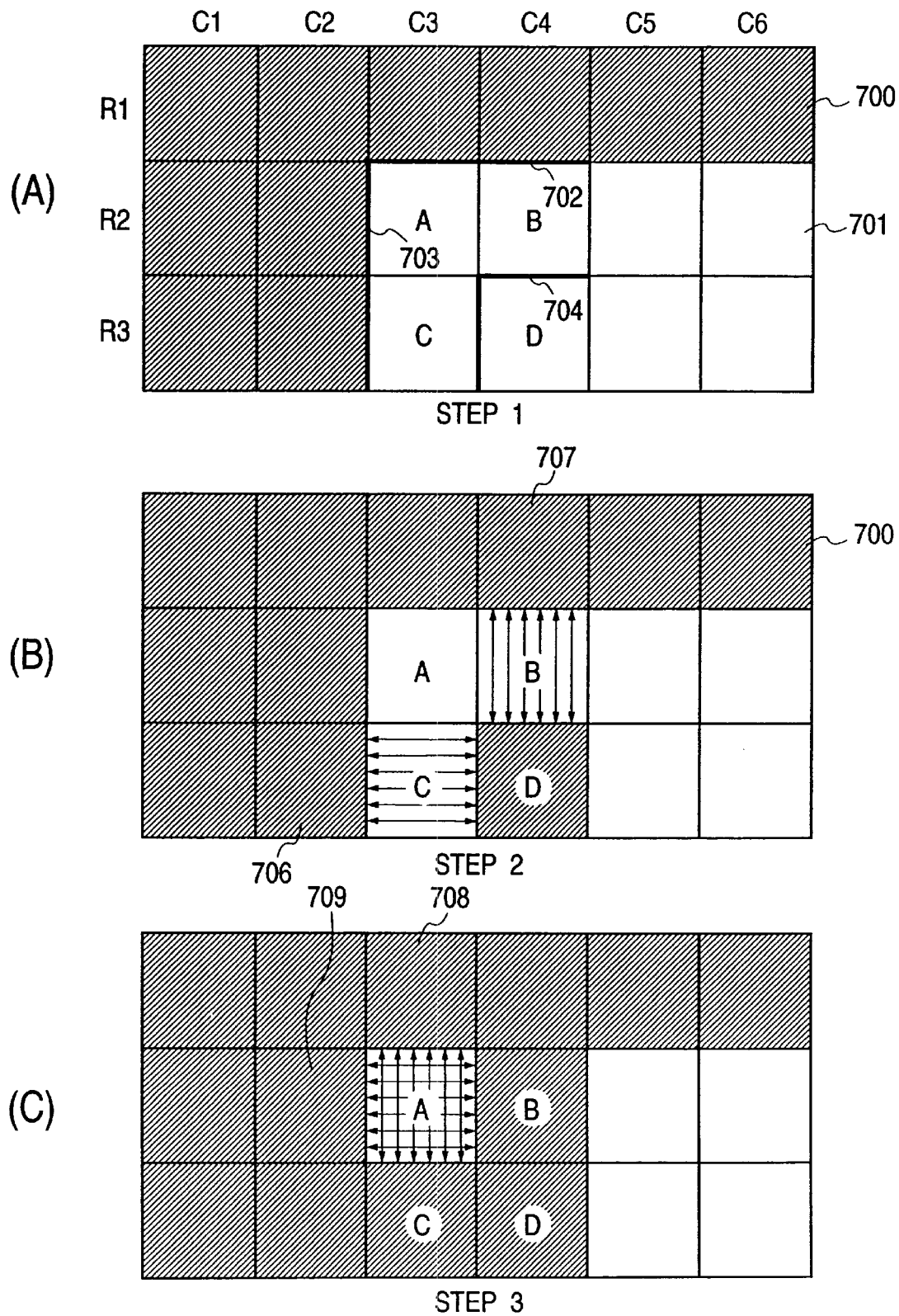
FIG. 3 is a conceptual diagram for describing successive stages in deriving predicted pixel values for respective sets of adjacent prediction blocks, with the embodiment of FIG. 1.

The operation of this embodiment is as follows. The input digital video signal from the input terminal 1 conveys a stream of successive images, i.e., as successive frames. In the following, the processing which is applied by this embodiment to a single image will be described. The pixel values of an image, supplied via the input terminal 1, are arranged by the block conversion section 2 into an array of blocks of pixels, part of which is shown in FIG. 3, with sets of pixel values respectively corresponding to these blocks being produced from the block conversion section 2 in a predetermined sequence. It will be assumed that in the condition shown in diagram (A) of FIG. 3, the blocks contained within the hatched-line region 700 have already been encoded by the apparatus, and that the blocks constituting the blank region 701 remain to be encoded. In that condition, the blocks indicated as A, B, C, D are successively produced from the block conversion section 2 in the sequence D, C, B, A. That is to say, successive sets of pixel values of four blocks of two adjacent columns of the array of blocks are produced and processed as respective sets. In addition, control signals for the switches 3, 5, 16 and 19 are generated by the block conversion section 2 in synchronism with the production of these blocks. Such a manner of processing blocks in sets of four units at a time is generally used in the prior art for processing the luminance component of a video signal, in the case of the 4:2:0 type of encoding.

Each of the D-blocks of such sets of four blocks is encoded as an intra-block, while the remaining three blocks, i.e. the A-block, the B-block and the C-block are each encoded as prediction blocks, as described in the following.

When a D-block is to be encoded, the switches 3, 5 are set such as to transfer the pixel values of that D-block from the output of the block conversion section 2 to be directly input to the encoding section 6. In the encoding section 6, that set of pixel values is encoded in the usual manner, i.e. by DCT (Discrete Cosine Transform) processing followed by quantization, and data compression encoding of the quantized DCT coefficients (such as variable-length encoding), to thereby obtain output code for that D-block, with the code being supplied to the output terminal 7.

In addition, the code which has thus been generated is supplied to the decoding section 18, in which the inverse operation to that of the encoding section 6 is applied, to thereby obtain reconstructed pixel values of the D-block. At that time, the switch 16 supplies to one input of the prediction adder 17 a zero state value, while the reconstructed pixel values of the D-block are being supplied to the other input of the prediction adder 17, so that these pixel values are transferred directly to each of the block memories 9, 11 and the block line memory 15, to be stored in each these memories.

It can thus be understood that in this condition, the set of reconstructed pixel values of the D-block, i.e. a block which is separated by one block in the vertical (column) direction and by one block in the horizontal (row) direction from the region 700 of blocks which have already been encoded, have been derived by independent internal encoding and stored in each of the memories 9, 11 and 15. The operations which are then executed are illustrated by diagram (B) of FIG. 3, i.e. Step 2. The reconstructed pixel values which are derived for each C-block are stored in one of the block memories 9, 11, and the reconstructed pixel values derived for each B-block are stored in the other. It will be assumed in the following that the reconstructed pixel values for each C-block are stored in the block memory 11, while those of each B-block are stored in the block memory 9.

Figure 4:
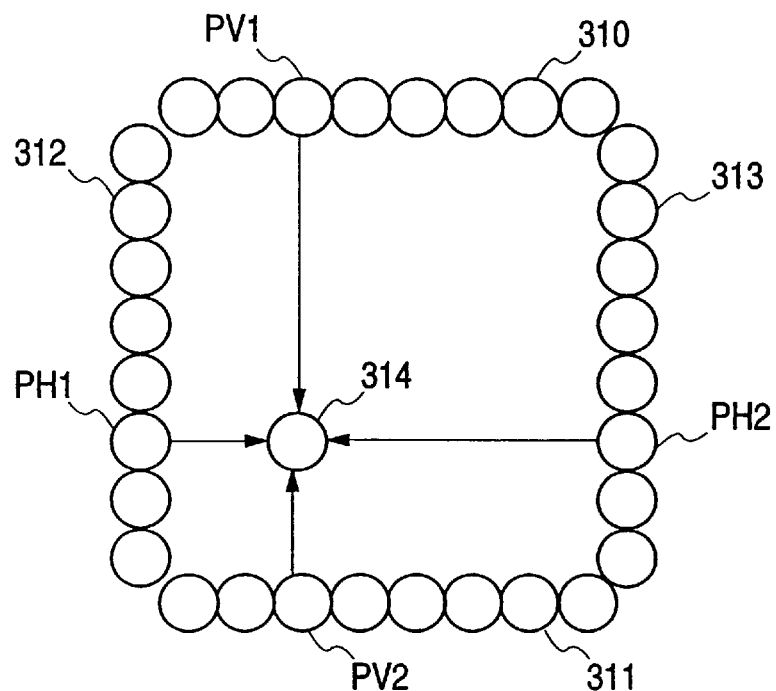
FIG. 4 is a conceptual diagram for illustrating inter-block interpolation processing which is executed using pixels of mutually adjacent blocks to derive predicted pixel values, with the present invention.
Figure 5:
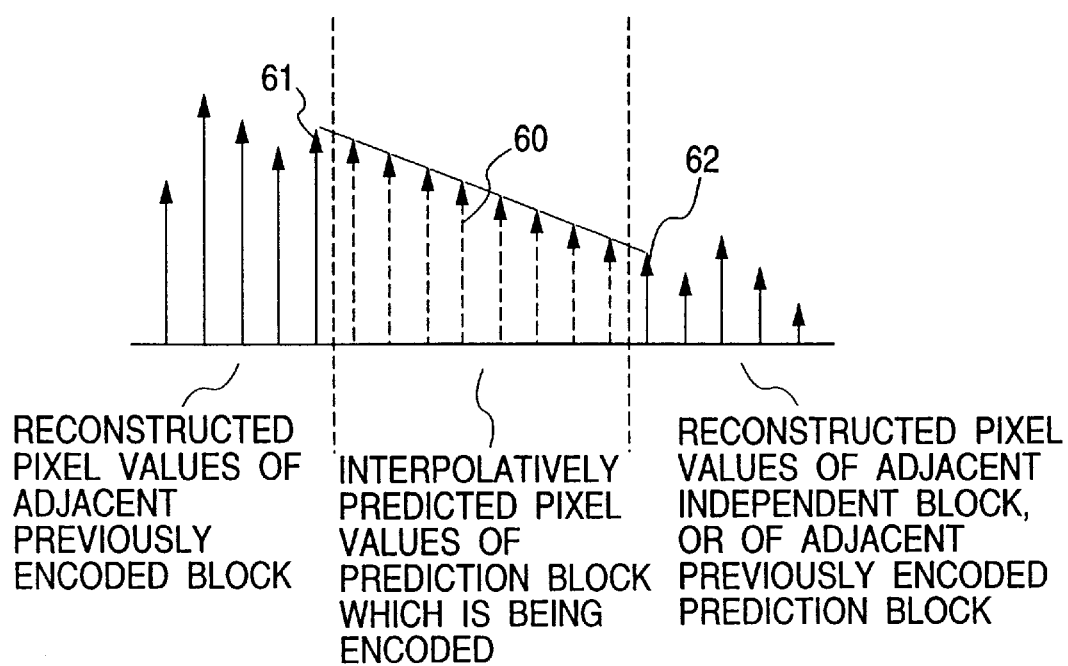
FIG. 5 is a corresponding diagram illustrating examples of respective pixel values of pixels in such blocks, for the case of linear interpolation.

Firstly, the pixel values of the C-block are successively produced from the block conversion section 2, with the switch 3 being set to transfer these pixel values to one input of the prediction subtractor 4, the switch 5 being set to transfer resultant difference values (i.e. prediction error values) produced from the prediction subtractor 4 to the encoding section 6, and the switch 19 being set to transfer predicted pixel values which are produced from the adder 13 to the other input of the prediction subtractor 4. As a pixel value of the C-block is thus being supplied to the prediction subtractor 4, the multipliers 12 and 14 are controlled to operate in conjunction with the adder 13 to derive an interpolated pixel value corresponding that pixel value of the C-block, by utilizing reconstructed pixel values of the adjacent most recently encoded D-block and of an adjacent block 706 (i.e., an independent block which has been previously encoded) of the already encoded region 700. The interpolation operation is illustrated in FIG. 4 for the cases of interpolation in both the horizontal and vertical directions. In the case of the C-block, an interpolated pixel value for a pixel value 314 is derived from the reconstructed values of two pixels PH1, PH2 of two adjacent edge columns of two adjacent blocks which are disposed at the left side and right side respectively of the block which is being encoded. This can be achieved by simple linear interpolation as illustrated in FIG. 5, which shows an example of pixel values of pixels which lie along a common row or column direction in two blocks which sandwich a prediction block, with respective edge pixel values of the two enclosing blocks being designated as 61, 62 respectively, and interpolated pixel values derived based on the pixel values 61, 62 being designated by numeral 60.

The value k of the multiplier factors set for the multipliers 12 and 14 are in the range 1/8 to 8/9 (assuming an 8×8 element block size), with the respective values of k that are set of these multipliers being determined by the prediction control section 8 in accordance with the position (along the interpolation direction) of the pixel whose value is being predicted, in relation to the reference pixels which are being used for the interpolation.

Figure 17:
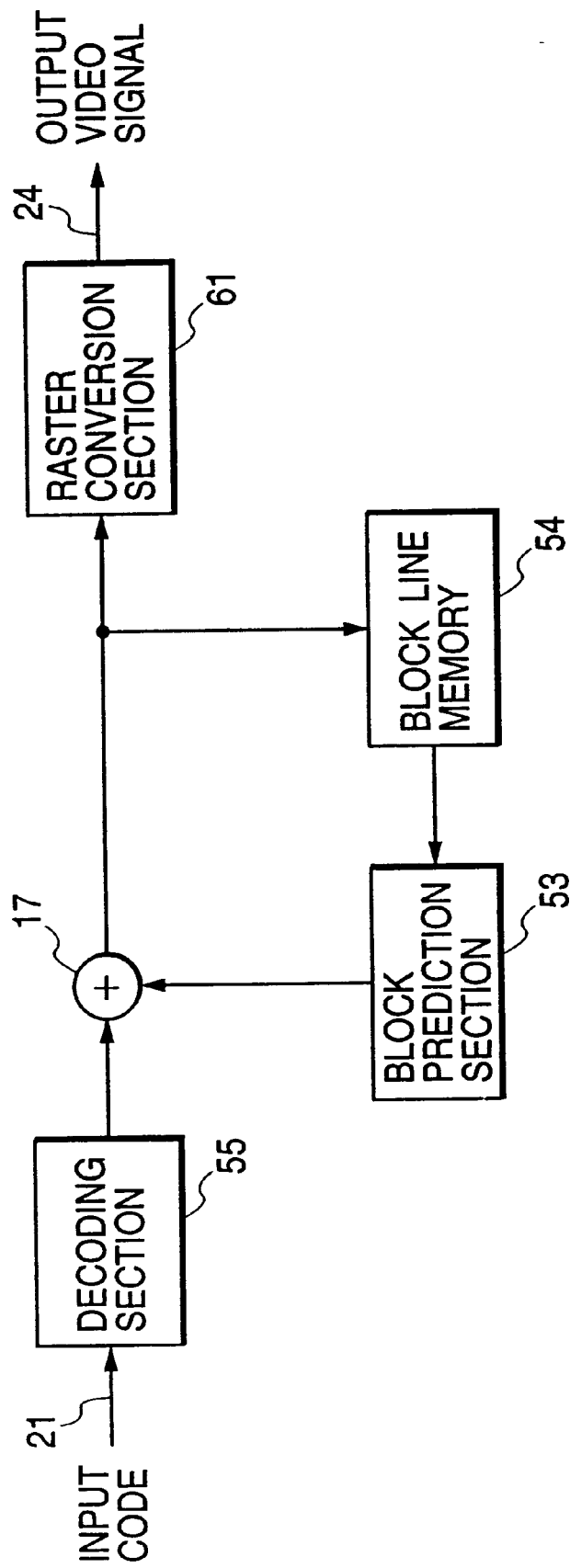
FIG. 17 is a general system block diagram of an embodiment of an inter-block interpolative prediction decoding apparatus corresponding to the inter-block interpolative prediction encoding apparatus of FIG. 16.
Figure 18:
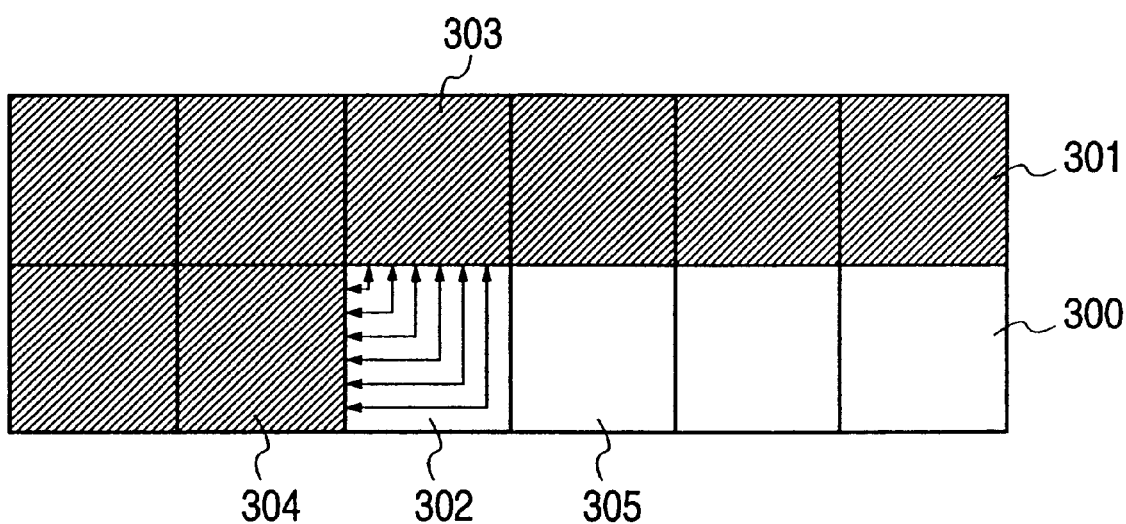
FIG. 18 is a conceptual diagram for describing the process of deriving predicted pixel values for a prediction block, by extrapolation from pixel values of already encoded blocks, with the inter-block extrapolative prediction encoding apparatus of FIG. 16.

With such an encoding apparatus, it is necessary for the block line memory 15 to be capable of storing twice the number of pixel values that must be stored by the block line memory 54 of the prior art inter-block interpolative prediction encoding apparatus of FIG. 17. However it be understood that with such interpolation processing, it is not essential to store the pixel values of entire blocks in the memories 9, 11 and 15, since it is only necessary to use pixels located along respective edges of those blocks which are to be used in the next interpolation operations, i.e., the edge regions indicated by numerals 702, 703, 704 in FIG. 3.

Derivation of a predicted pixel value for a pixel of the C-block shown in diagram (B) of FIG. 3 is executed as follows. The appropriate one of the left-edge reconstructed pixel values of the D-block which has just been encoded is read out from the block line memory 15 and supplied to the multiplier 14, while at the same time the appropriate one of the right-edge pixel values of the opposing block 706 of the region which has already been encoded is read out from the block memory 11 and supplied to the multiplier 12, with requisite multiplier factors being established by the control signals 8a from the prediction control section 8. The output values from the multipliers 12, 14 are summed in the adder 13 to obtain the required interpolated pixel value, which is then transferred by the switch 19 to an input of the subtractor 4. At that time, the actual value of that pixel is read out from the block conversion section 2 and supplied to the prediction subtractor 4. The corresponding prediction error value is thereby output from the prediction subtractor 4, and is transferred by the switch 5 to be input to the encoding section 6.

In that way, a complete set of prediction error values for the respective pixels of the C-block are supplied to the encoding section 6, and encoded. With the present invention, rather than apply orthogonal DCT processing to such a set of prediction error values, one-dimensional DST (Discrete Sine Transform) processing is executed along the interpolation direction (i.e. the horizontal direction of the array of prediction error values) and DCT processing is executed along the direction perpendicular to the interpolation direction (i.e., the vertical direction in this case). The resultant transform coefficient values are then quantized and encoded in the encoding section 6, e.g., by variable-length encoding, to generate a code portion corresponding to that C-block, which is supplied to the output terminal 7 and also to the decoding section 18. It is preferable to apply 1-dimensional DST processing along the direction in which prediction is executed, in order to achieve improved encoding efficiency. The code thus derived for that C-block is decoded by the decoding section 18, to generate a set of reconstructed prediction error values respectively corresponding to the pixels of that block, with these values being successively applied to one input of the prediction adder 17. At this time the switch 16 is set to transfer the corresponding predicted pixel values from the adder 13 (via switch 19) to the other input of the prediction adder 17, which thereby outputs corresponding reconstructed pixel values. The reconstructed pixel values for the C-block which are thereby successively derived are stored in the block memory 11 and also in the block line memory 15.

The B-block shown in diagram (B) of FIG. 3 is then similarly encoded, and a corresponding set of reconstructed pixel values derived and stored, in a similar manner to that described for the C-block. However in this case interpolative prediction is executed along the vertical direction, i.e. with values used in the interpolation being obtained as reconstructed pixel values of upper edge pixels of the D-block which has just been encoded, and lower edge elements of the block 707 of the already encoded region, which are respectively read out from the block memory 9 and from the block line memory 15. The encoding section 6 again applies one-dimensional DST processing along the interpolation direction, and one-dimensional DCT processing in the direction perpendicular thereto, to the array of prediction error values thus obtained by subtracting these predicted pixel values from the actual pixel values of the B-block, in subtractor 4. The code thus obtained for the B-block is supplied to the output terminal 7, and a set of reconstructed pixel values corresponding to that B-block are obtained from the prediction adder 17 are stored in the block line memory 15 and also in the block memory 9.

The step 3, shown in diagram (C) of FIG. 3 has now been reached, in which the A-block is encoded by using the sets of reconstructed pixel values which have been derived and stored for the C-block and B-block in step 2 described above. The operation is essentially identical to that described above for encoding of the C-block and B-block, however in this case, interpolative prediction is executed in both the vertical and horizontal directions. The conditions of the switches 3, 5, and 16 are held unchanged from those utilized for encoding of the C-block and B-block, however the switch 19 is set to transfer predicted pixel values which are generated by the prediction signal generating section 20 to the prediction subtractor 4 and to the prediction adder 17.

Predicted pixel values are derived for the A-block by interpolation along the vertical direction, i.e., by utilizing appropriate ones of the upper edge reconstructed pixel values of the C-block (read out from the memory 11) and of the lower edge reconstructed pixel values of the block 708 of the region of blocks which have already been encoded (from memory 15), and by interpolation along the horizontal direction, utilizing left-edge reconstructed pixel values of the B-block (read out from memory 9) and right-edge reconstructed pixel values of the opposing block of the already encoded region (from memory 15). Respective pairs of predicted pixel values, derived by vertical interpolation and horizontal interpolation, are thereby derived for each of the pixels of the A-block, and supplied to the prediction signal generating section 20 whereby respective combined predicted pixel values are generated, and supplied to the subtractor 4.

Various methods could be envisaged for combining such a pair of predicted pixel values, such as taking the average of these values, or the mean square of the values. As each such combined predicted pixel value for the A-block is generated by the prediction signal generating section 20 and supplied via the switch 19 to the prediction subtractor 4, the corresponding actual pixel value is output from the block conversion section 2 and supplied to the prediction subtractor 4, to thereby derive the corresponding prediction error value, which is supplied to the encoding section 6. The set of prediction error values which is thereby derived for the A-block is then encoded by the encoding section 6, using DST processing along both the row and column directions, with the resultant coefficients being encoded as described for the B-blocks and C-blocks, and the resultant code being supplied to the output terminal 7.

The next set of four adjacent blocks of the image are then encoded in the same manner as described above. In that way, successive pairs of rows of blocks are sequentially encoded, to encode the entire image.

Figure 6:
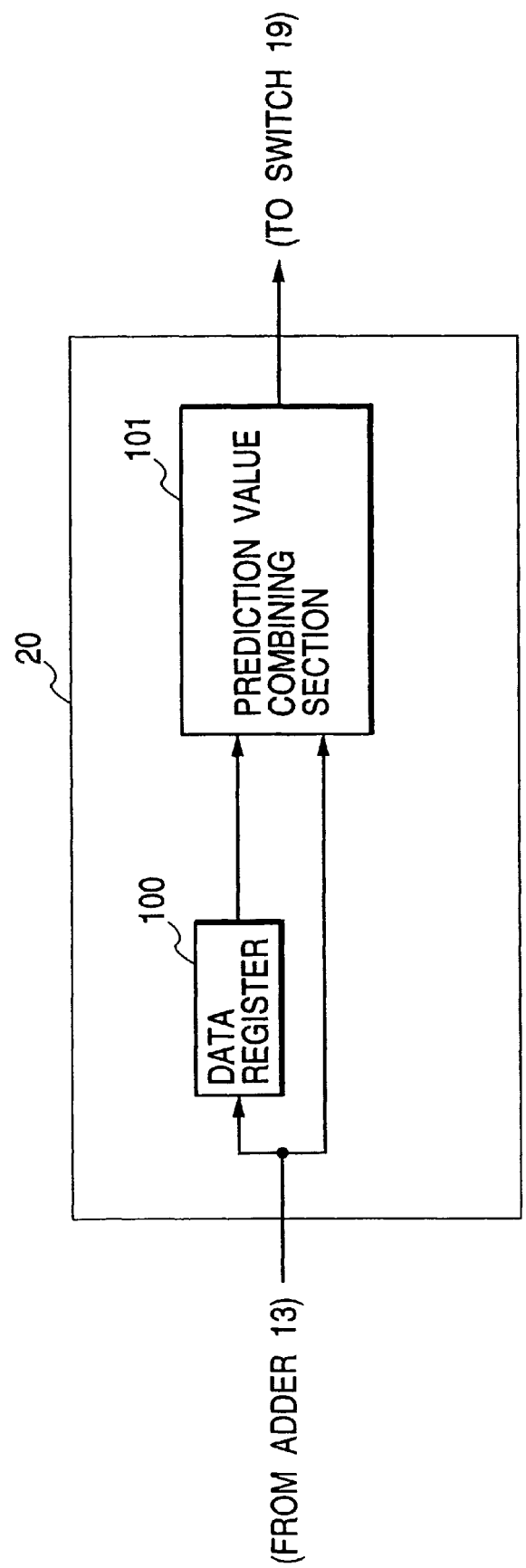
FIG. 6 is a general block diagram of an example of a prediction signal generating section utilized in the inter-block interpolative prediction encoding apparatus of FIG. 1.

If the two interpolated pixel values for each pixel of the A-block are derived sequentially, then the first value must be held temporarily in memory or in a data register within the prediction signal generating section 20, which in that case could have the basic configuration illustrated in FIG. 6.

Figure 7:
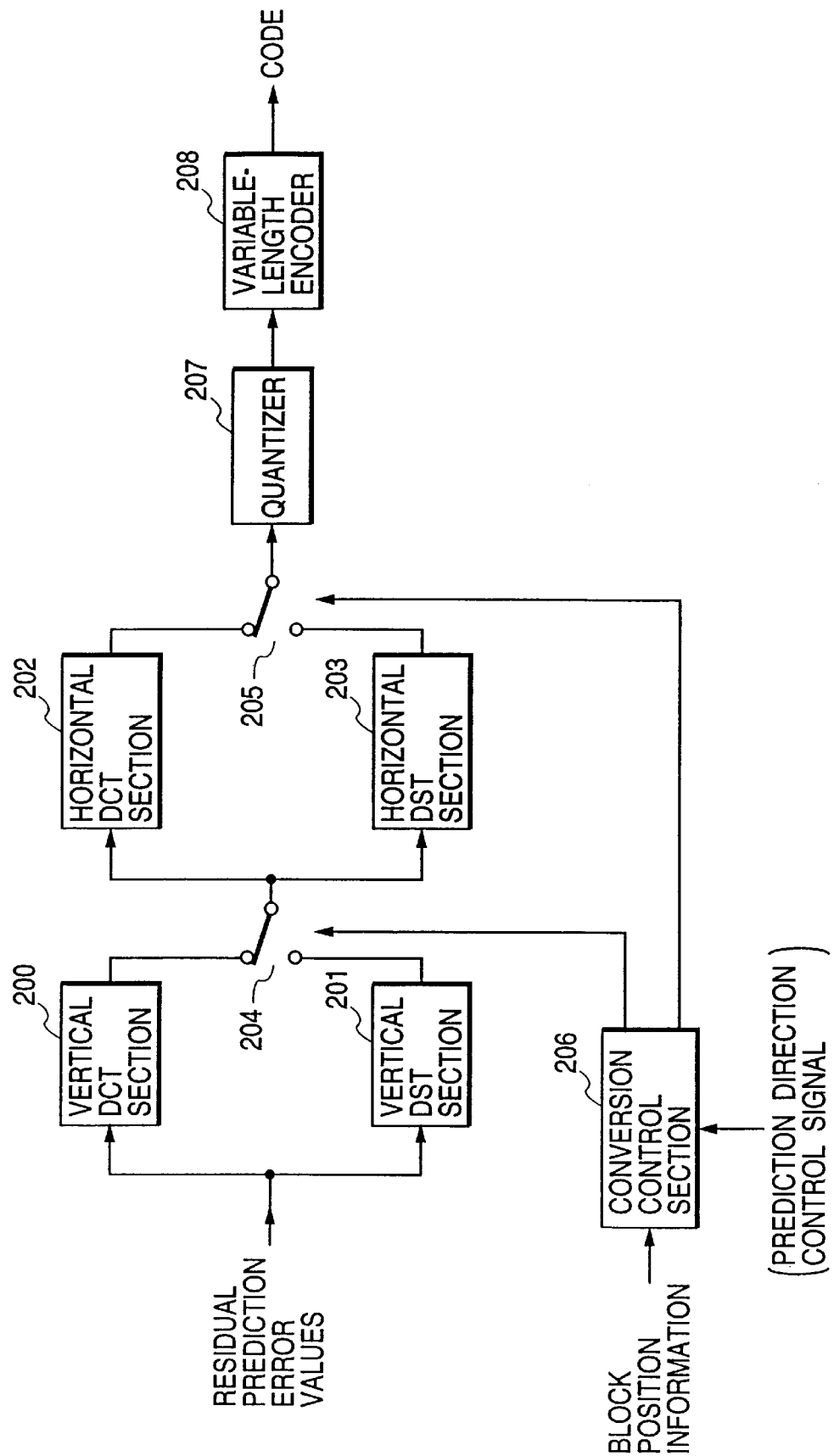
FIG. 7 is a system block diagram showing the internal configuration of an encoding section of the inter-block interpolative prediction encoding apparatus of FIG. 1, in which one-dimensional DST (Discrete Sine Transform) processing is applied to an array of prediction error values, along the same direction as that used in executing interpolative prediction for deriving these values.

FIG. 7 shows an example of the internal configuration of the encoding section 6 of the above embodiment. In FIG. 7, control signals expressing block position information and the direction in which interpolative prediction is currently being executed are supplied to a conversion control section 206, from the block conversion section 2 and the prediction control section 8 respectively. The conversion control section 206 thereby generates control signals for controlling switches 204, 205 to select the appropriate combination of DCT and DST processing to be applied to the set of prediction error values derived for a block, along the horizontal and vertical directions. The resultant coefficients are quantized by quantizer 207, and the quantized coefficients encoded by a variable-length encoder 208. The "prediction direction control information" shown in FIG. 7 is not utilized with the embodiment of FIG. 1, but may be utilized with another embodiment of the invention as described hereinafter.

With such inter-block encoding, it is found that the respective DC components of adjacent blocks will not differ greatly from one another, i.e., the respective DC coefficients obtained for the blocks by the DCT/DST transform processing will tend to vary only gradually, from block to block. For that reason, improved encoding efficiency can be achieved by applying variable-length encoding to the quantized DC coefficients which are derived for the blocks of an image, as well as to the AC coefficients derived for each block.

It can be understood that with the memory allocation arrangement described above for the block memories 9, 11, the switch 10 is controlled such as to transfer an appropriate reconstructed pixel value from the block memory 11 to the multiplier 12 each time that interpolation is to be executed along the horizontal direction, using pixel values of a D-block or of a B-block (read out from memory 11) in conjunction with pixel values of the already encoded region (read out from memory 15), and is controlled such as to transfer an appropriate reconstructed pixel value from the block memory 9 to the multiplier 12 each time that interpolation is to be executed along the vertical direction, using pixel values of a D-block or of a C-block in conjunction with pixel values of the already encoded region.

Figure 2:
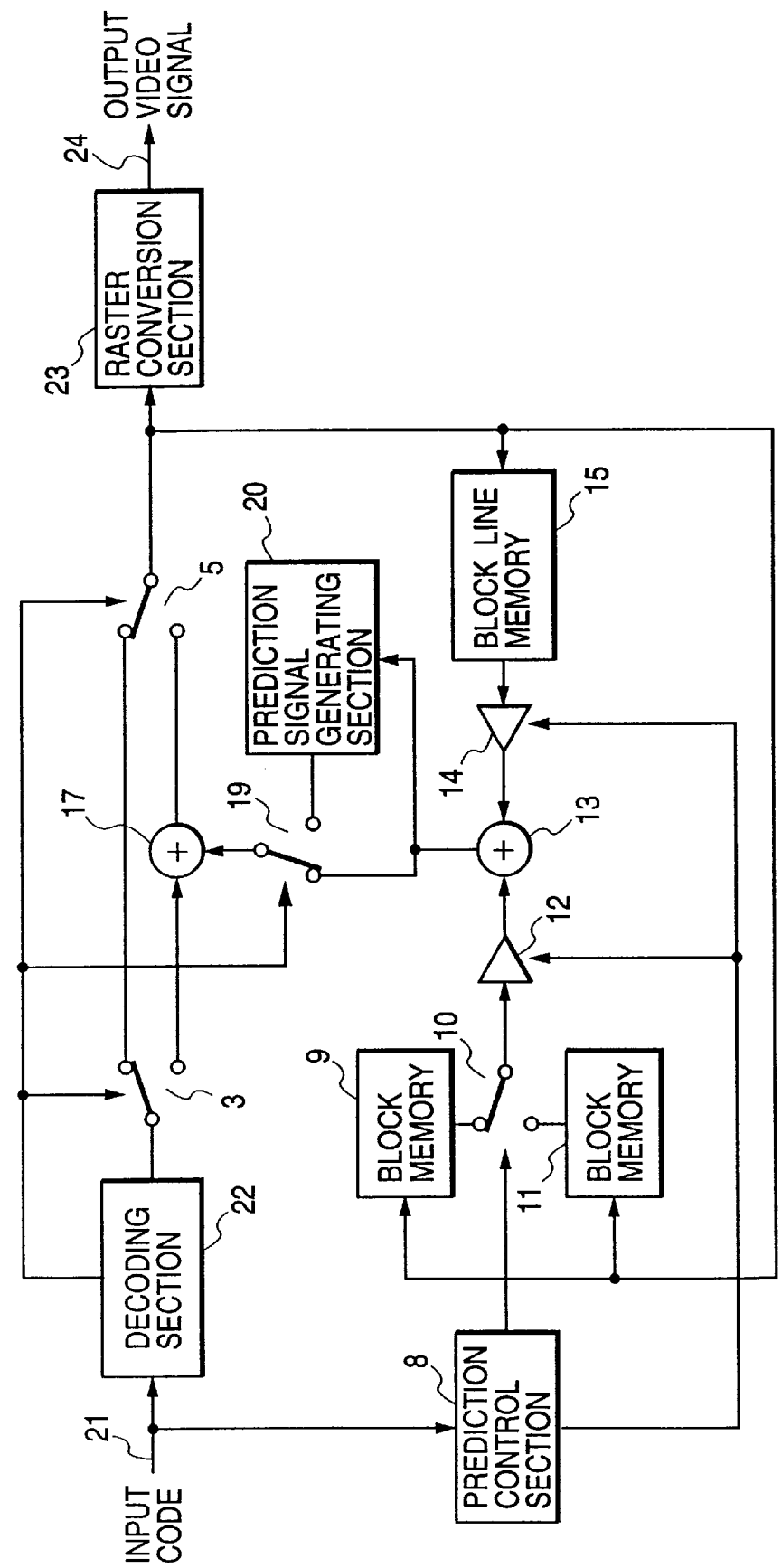
FIG. 2 is a general system block diagram of an embodiment of an inter-block interpolative prediction decoding apparatus corresponding to the inter-block interpolative prediction encoding apparatus of FIG. 1.

The operation of an embodiment of an inter-block interpolative prediction decoding apparatus corresponding to the inter-block interpolative prediction encoding apparatus of FIG. 1 will be described referring to the general system block diagram of FIG. 2. In FIG. 2, components having identical functions to components of the embodiment of FIG. 1 or the prior art example of FIG. 17 are designated by identical reference numerals. The operation of this inter-block interpolative prediction decoding apparatus is substantially identical to that whereby reconstructed pixel values are derived in the inter-block interpolative prediction encoding apparatus of FIG. 1. The code stream which has been generated by the inter-block interpolative prediction encoding apparatus of FIG. 1 is supplied via an input terminal 21 to a decoding section 22, in which the respective portions of that code stream corresponding to the aforementioned A-blocks, B-blocks, C-blocks and D-blocks are decoded and sets of prediction error values respectively corresponding to the A-blocks, B-blocks and C-blocks are thereby obtained, together with respective sets of reconstructed pixel values corresponding to the independent blocks, i.e. to the D-blocks. These sets of values corresponding to the respective blocks are output from the decoding section 22 in the same sequence of successive sets of four blocks, as described above for the inter-block interpolative prediction encoding apparatus of FIG. 1, i.e. the sequence D, C, B, A, D, C, B, A, . . . When the decoded pixel values for an independent block, i.e. a D-block, are being output from the decoding section 22, control signals from the decoding section 22 hold the switches 3, 5 in a condition for transferring these pixel values directly to a raster conversion section 23, and also to be stored in each of the block line memory 15 and the block memories 9 and 11. While the decoding prediction error values for a prediction block are being output from the decoding section 22, the switches 3, 5 transfer these values successively to the prediction adder 17, to be added to a corresponding predicted pixel value, which is supplied via the switch 19. The reconstructed pixel values which are thereby derived for that prediction block are transferred by the switch 5 to the raster conversion section 23, and also are stored in the block memory 9 or block memory 11. That is to say, in the same way as described for the inter-block interpolative prediction encoding apparatus of FIG. 1, it can be assumed that the reconstructed pixel values derived for a B-block are stored in the block memory 9, while those derived for a C-block are stored in the block memory 11.

Sets of predicted pixel values are derived each B-block and each C-block by vertical interpolation and horizontal interpolation respectively, in the same manner as described above referring to FIG. 3. The resultant sets of reconstructed pixel values, stored in the block memories 9, 11 respectively, are then utilized to obtain pairs of predicted pixel values for respective pixels of the corresponding A-block, by horizontal and vertical interpolation between these pixel values and reconstructed pixel values of blocks which have been previously decoded, read out from the block line memory 15. Resultant combined reconstructed pixel values are thereby derived for the A-block by the prediction signal generating section 20, and transferred via the switch 19 to the prediction adder 17.

In that way, respective sets of reconstructed pixel values are decoded for the set of blocks constituting an image, and supplied to the raster conversion section 23, in which the sequence of pixel values of that image is restored to that of a normal raster scan video signal. The resultant decoded digital video signal is supplied to the output terminal 24.

Figure 8:
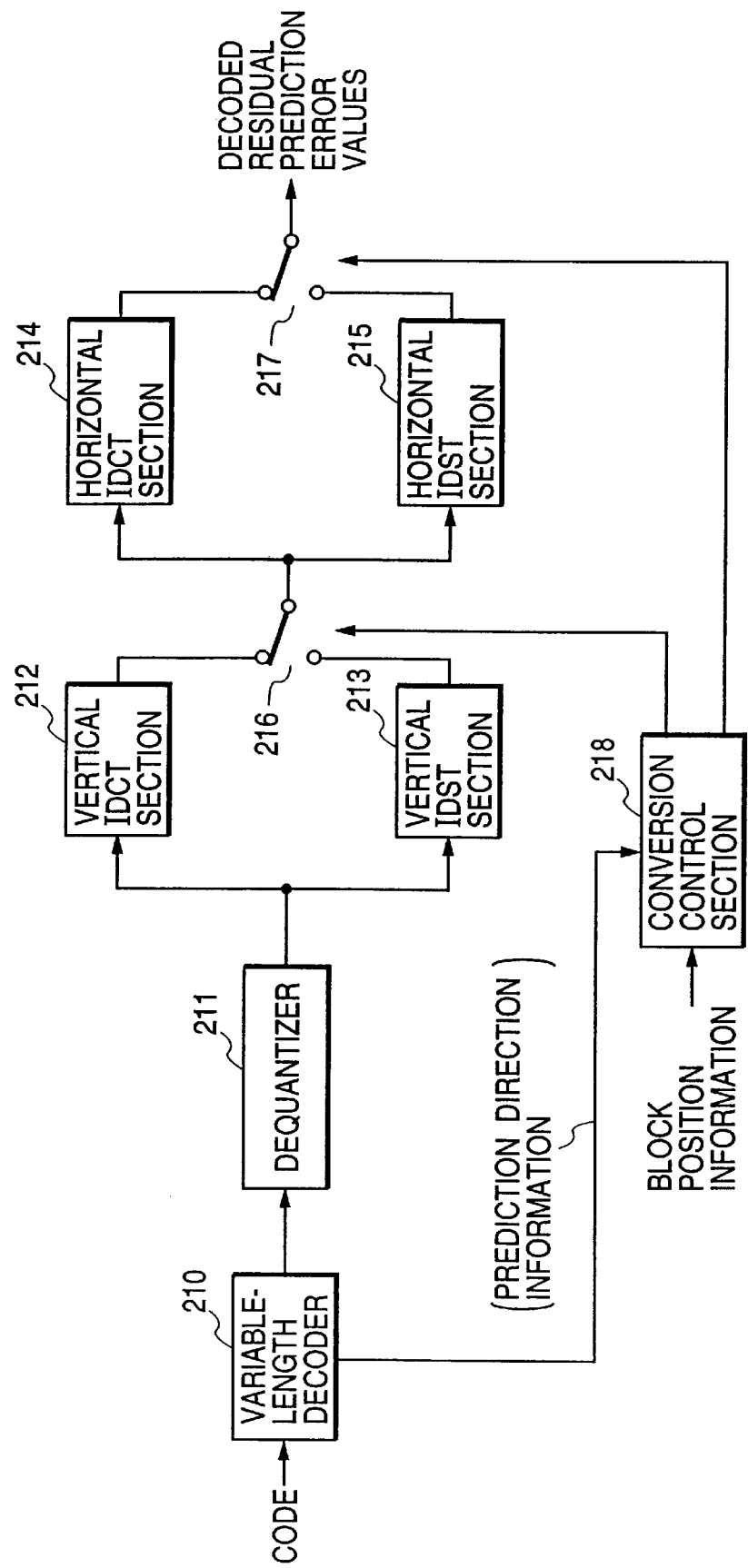
FIG. 8 is a system block diagram of a decoding section of the decoding apparatus embodiment of FIG. 2.

FIG. 8 shows an example of a suitable configuration for the decoding section 18 of the encoding apparatus embodiment of FIG. 1. The configuration of the decoding section 22 of the decoding apparatus of FIG. 2 can be similar to that shown in FIG. 8, with the addition of a capability for generating the necessary switch control signals. Since as described above the code portions expressing respective blocks of an image are transmitted in a predetermined sequence by the encoding apparatus, the block position information can be easily derived by the decoding section 22, so that description is omitted. The "prediction direction control information" shown in FIG. 8 is not utilized with the embodiment of FIG. 2, but may be utilized with another embodiment of the invention as described hereinafter.

Figure 9:
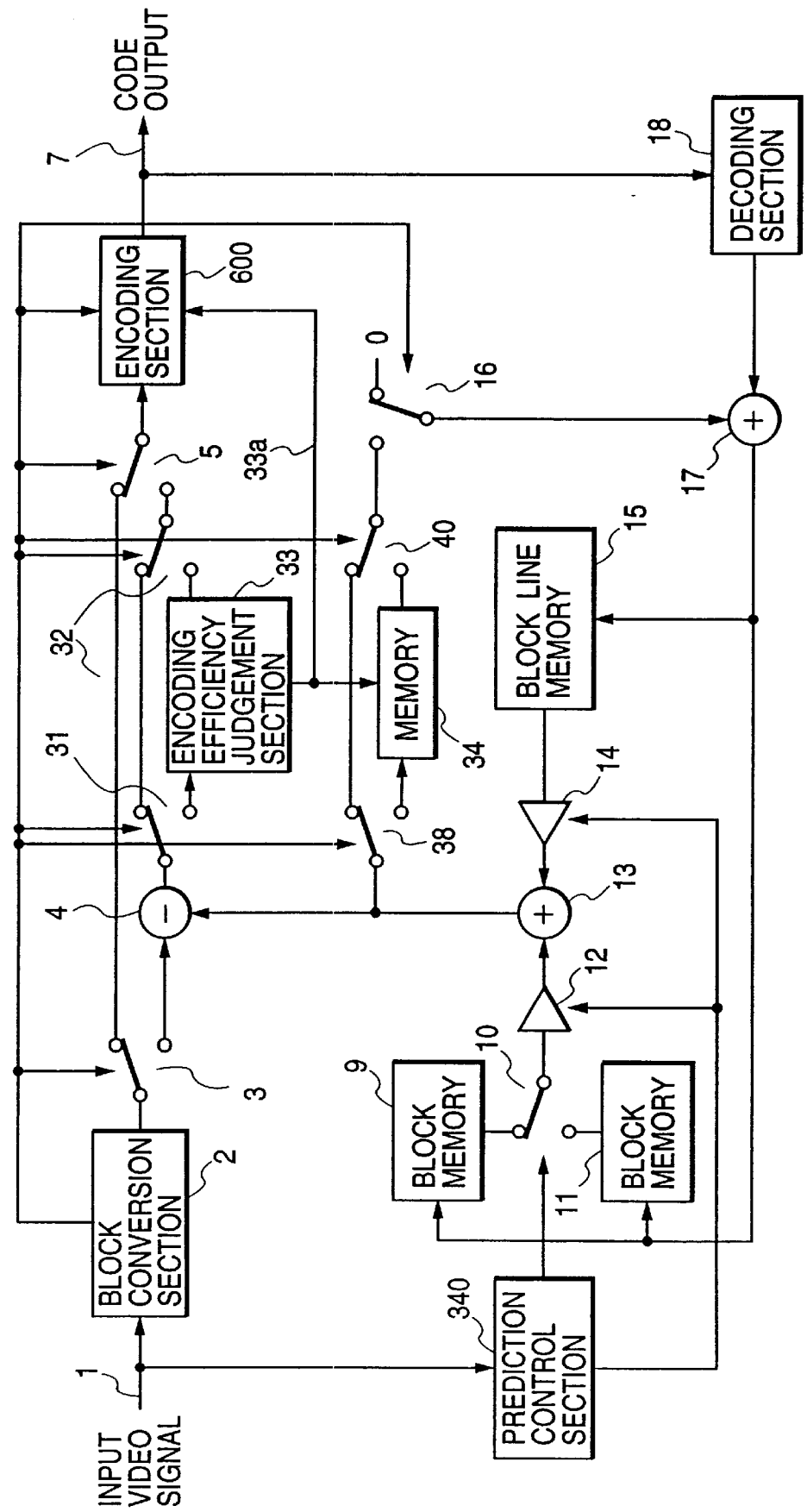
FIG. 9 is a general system block diagram of a second embodiment of an inter-block interpolative prediction encoding apparatus according to the present invention, which is an adaptive encoding apparatus whereby a judgement is made of an optimum direction of interpolation for deriving prediction error values of a prediction block.

A second embodiment of an inter-block interpolative prediction encoding apparatus according to the present invention will be described, referring to the general system block diagram of FIG. 9. In FIG. 9, components having identical functions to components of the embodiment of FIG. 1 are designated by identical reference numerals to those of FIG. 1, and detailed description of these will be omitted. The overall operation of this embodiment is substantially identical to that of the embodiment of FIG. 1, differing only with respect to the encoding of each A-block, of each of the sets of four A, B, C and D-blocks which are sequentially processed as described above referring to FIG. 3. Essentially, this embodiment differs from that of FIG. 1 by implementing adaptive prediction. To achieve this, the embodiment includes an encoding efficiency judgement section 33, which is utilized to determine whether the interpolated pixel values for an A-block are to be derived by interpolation along the horizontal or the vertical direction of the image. In addition, the embodiment includes a memory 34 for providing amounts of delay as required for the time involved in executing judgement operations by the encoding efficiency judgement section 33, and two pairs of switches 31, 32 and 38, 40, respectively controlled by control signals from the block conversion section 2. The switches 31, 32 transfer the prediction error values derived for a prediction block directly from the prediction subtractor 4 to the encoding section 600, when that prediction block is a B-block or a C-block, and transfer the prediction error values to be input to the encoding efficiency judgement section 33, when the prediction block is an A-block, and transfer a selected set or prediction error values for an A-block from the encoding efficiency judgement section 33 via switch 5 to the encoding section 600. Also, it is necessary for the encoding section 600 of this embodiment to execute multiplexing of interpolation direction information with the generated code, as described hereinafter. In addition, the prediction control section 340 controls the interpolation operations such that an entire set of predicted pixel values derived for an A-block by interpolation along the horizontal direction and an entire set of such pixel values derived for that A-block by interpolation along the vertical direction are respectively obtained from the adder 13 and input to the prediction subtractor 4, so that two sets of prediction error values respectively corresponding to the two interpolation directions are supplied to the encoding efficiency judgement section 33.

The processing executed to encode each of the B, C and D-blocks is identical to that described for the inter-block interpolative prediction encoding apparatus of FIG. 1. In the case of an A-block, when two sets of prediction error values respectively derived based on the two possible interpolation directions have been supplied to the encoding efficiency judgement section 33, the encoding efficiency judgement section 33 operates on these sets of prediction error values to judge which of these sets will result in generation of the smaller amount of code, when encoded by the encoding section 600. Based on the result of that judgement, the encoding efficiency judgement section 33 selects one of the two sets of prediction error values to be transferred to the encoding section 600, and encoded.

It is necessary for the inter-block interpolative prediction decoding apparatus to be aware of the interpolation direction which has been selected by the inter-block interpolative prediction encoding apparatus for an A-block, at the time of executing decoding of that A-block. For that reason, when an A-block is encoded, the encoding efficiency judgement section 33 generates data (as designated by 33*a* in FIG. 9) indicative of the interpolation direction which has been selected for that A-block, and supplies the direction indication data to the encoding section 600, to be multiplexed with the code which is generated by the encoding section 600.

Figure 11:
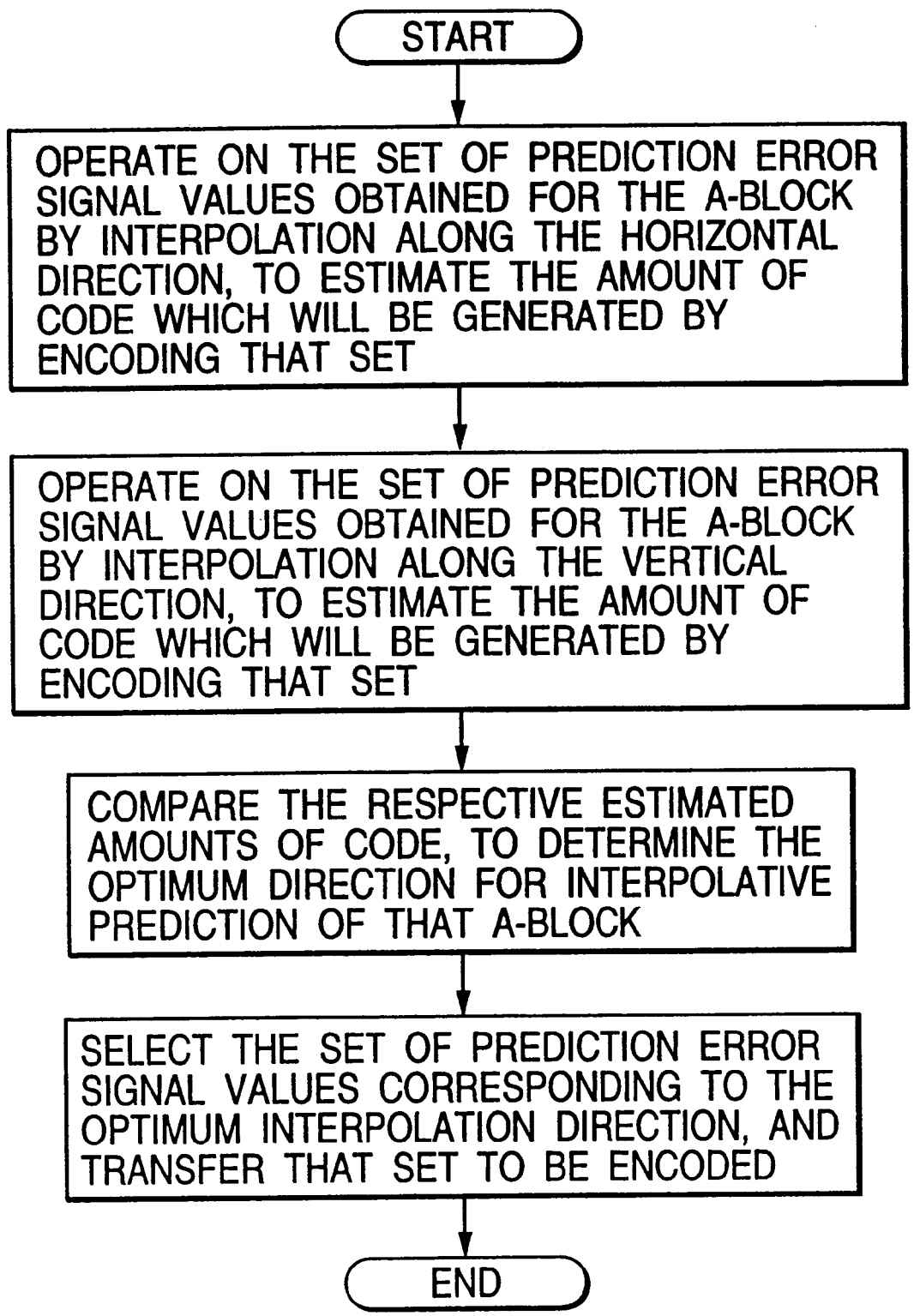
FIG. 11 is a flow diagram showing an example of processing executed by an encoding efficiency judgement section of the embodiment of FIG. 9, for implementing adaptive prediction by determining an optimum interpolation direction for predicted pixel values.
Figure 12:
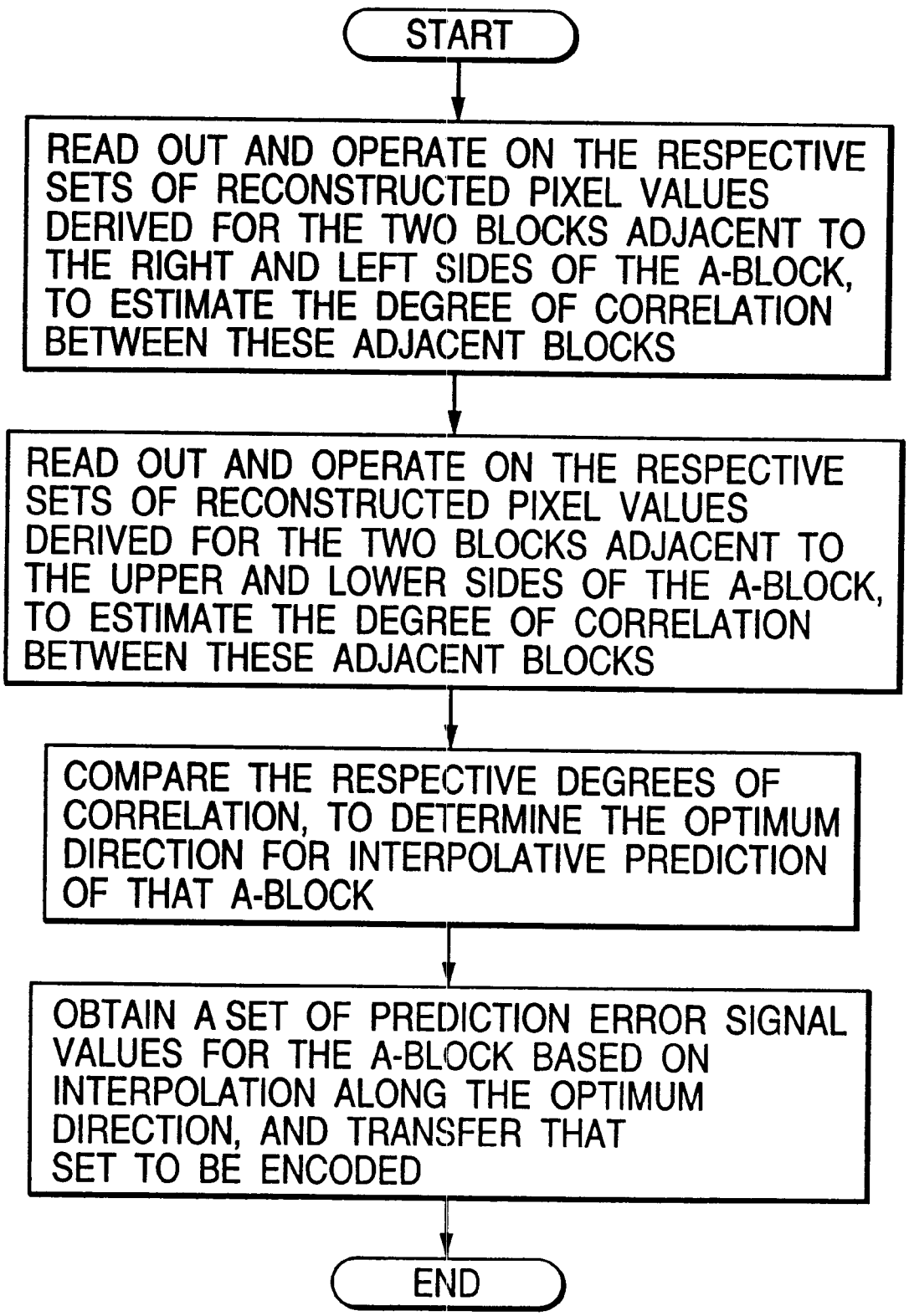
FIG. 12 is a flow diagram showing a second example of processing which can be executed by an encoding efficiency judgement section, for implementing adaptive prediction.

The basic operating sequence of the encoding efficiency judgement section is illustrated in the flow diagram of FIG. 11.

Various method can be envisaged for judging which of two sets of prediction error values will result in generation of the smaller amount of code, for an encoded A-block. The obvious method is of course to directly encode each set, in the same manner as is executed by the encoding section 600, and count the respective numbers of code bits which are produced for the case of interpolation along the horizontal direction and along the vertical direction. A second possible method is to calculate the respective averages of the two sets of prediction error values derived for an A-block, or their respective mean square values, and to select the set for which the smallest value is obtained.

In encoding the set of pixel values derived for an independent block, i.e., a D-block, the encoding section 600 applies orthogonal DCT processing, and in the case of the set of prediction error values derived for a B-block or a C-block applies one-dimensional DST processing along the interpolation direction and one-dimensional DCT processing along the direction perpendicular to the interpolation direction, in the same manner as described for the embodiment of FIG. 1. In the case of the set or prediction error values derived for an A-block by interpolation along a selected direction as described above, the encoding section 600 applies one-dimensional DST processing to the set of prediction error values, along that selected direction.

The encoding section 600 of the embodiment of FIG. 9 can be configured as shown in FIG. 7, i.e., with the prediction direction control information being utilized by the conversion control section 206 in determining whether DST processing is applied in the vertical direction or the horizontal direction to an A-block.

Figure 10:
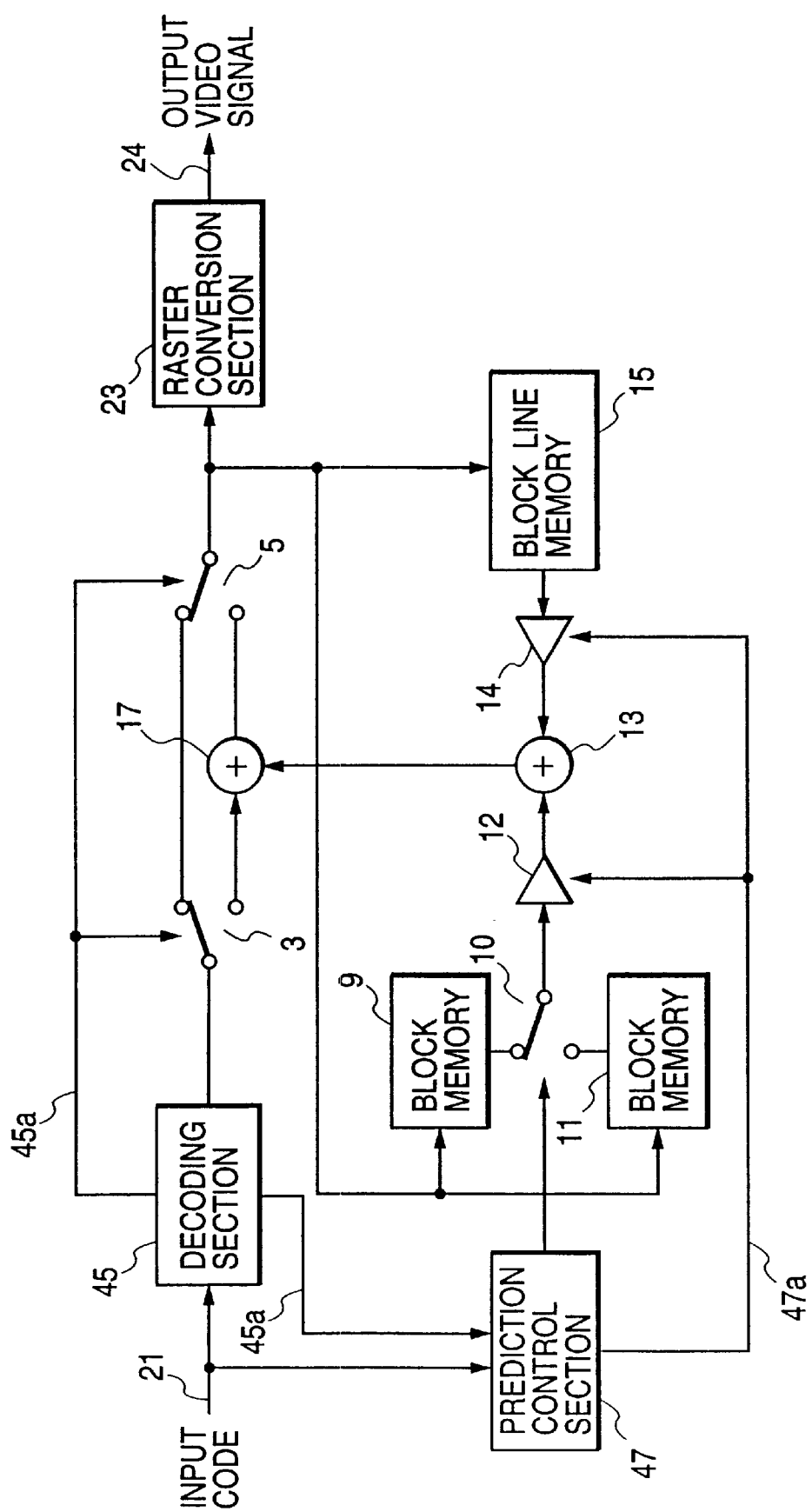
FIG. 10 is a general system block diagram of an embodiment of an inter-block interpolative prediction decoding apparatus corresponding to the inter-block interpolative prediction encoding apparatus of FIG. 9.

FIG. 10 is a general system block diagram of an embodiment of an inter-block interpolative prediction decoding apparatus corresponding to the inter-block interpolative prediction encoding apparatus of FIG. 9. The operation of the decoding apparatus of FIG. 10 is substantially identical to that of the embodiment of FIG. 2 described above, and differs only with respect to control of generating the reconstructed pixel values for each A-block. In FIG. 10, the decoding section 45 receives a stream of code which has been generated by the inter-block interpolative prediction encoding apparatus of FIG. 9, at an input terminal 21, and executes decoding of that code in the same manner as the decoding section 22 of the embodiment of FIG. 2, while also executing demultiplexing to separate the data expressing the aforementioned interpolation direction information for respective A-blocks from the code stream. In FIG. 10, the interpolation direction data 45*a* thereby obtained from the decoding section 45 are supplied to the prediction control section 47. The prediction control section 47 performs identical processing and control operations to those of the prediction control section 8 of the embodiment of FIG. 2, with respect to each of the B, C and D-blocks. However when the code for an A-block is decoded by the decoding section 45, the prediction control section 47 determines, from the corresponding interpolation direction information 45*a*, the interpolation direction which will be utilized. Specifically, assuming the previously described assignment of the B and C-blocks to the block memories 9, 11, if the horizontal interpolation direction is indicated, then the switch 10 is set such as to transfer reconstructed pixel values of the appropriate B-block from the block memory 9, whereas if vertical interpolation is indicated then the switch 10 is set such as to transfer reconstructed pixel values of the appropriate C-block from the block memory 11. The interpolated pixel values which are thereby derived for the A-block are supplied to the prediction adder 17 in synchronism with read-out of the corresponding ones of the decoded prediction error values for that A-block, from the decoding section 45, to thereby obtain the corresponding reconstructed pixel values, which are transferred by switch 5 to the raster conversion section 23.

In all other respects, the operation of this inter-block interpolative prediction decoding apparatus embodiment identical to that of FIG. 2 described above.

The decoding section 45 of the embodiment of FIG. 10 can be configured as shown in FIG. 8, i.e., with the prediction direction control information being separated from the input code stream by the variable length decoder 210, and utilized by the conversion control section 218 in determining whether inverse DST processing is to be applied in the vertical direction or the horizontal direction to the decoded set of prediction error values which are derived for an A-block.

As an alternative to the method of encoding efficiency judgement which is used with the inter-block interpolative prediction encoding apparatus embodiment of FIG. 9, it is possible to judge the interpolation direction for which optimum encoding efficiency will be achieved when encoding an A-block, by estimating the respective degrees of correlation between the reconstructed pixel values of each of the two pairs of blocks whose values can be used in the interpolation. That is to say, referring to diagram (C) of FIG. 3, if for example it is judged that there is a higher degree of correlation between reconstructed pixel values of the B-block (held in the block memory 9) and those of the encoded block 709 (held in the block line memory 15), than there is between the reconstructed pixel values of the C-block (held in the block memory 11) and those of the encoded block 708, then the highest encoding efficiency can be expected to be achieved if interpolation along the horizontal direction is utilized for prediction of the A-block values.

The basic operation in that case is illustrated in the flow diagram of FIG. 11.

With such an inter-block interpolative prediction encoding apparatus embodiment which utilizes inter-block correlation judgement to determine the appropriate interpolation direction to be utilized for determining the interpolated pixel values for an A-block, it becomes unnecessary to multiplex the interpolation direction information with the code which is generated by the encoding apparatus, since the operation for judging the respective degrees of correlation can be executed by the inter-block interpolative prediction decoding apparatus, through operating on the sets of reconstructed pixel values which are derived by the decoding apparatus, to thereby obtain the interpolation direction information in the same manner as for the encoding apparatus.

In practice, it would be possible to judge only the respective degrees of correlation between the sets of reconstructed pixel values which may actually be used in the interpolation operation, i.e., the correlation between opposing edge columns of reconstructed pixel values of the two adjoining (left and right-side) blocks which are used in horizontal interpolation of the A-block values, and between the opposing edge rows of reconstructed pixel values of the two adjoining (upper side and lower side) blocks which are used in vertical interpolation.

Figure 13:
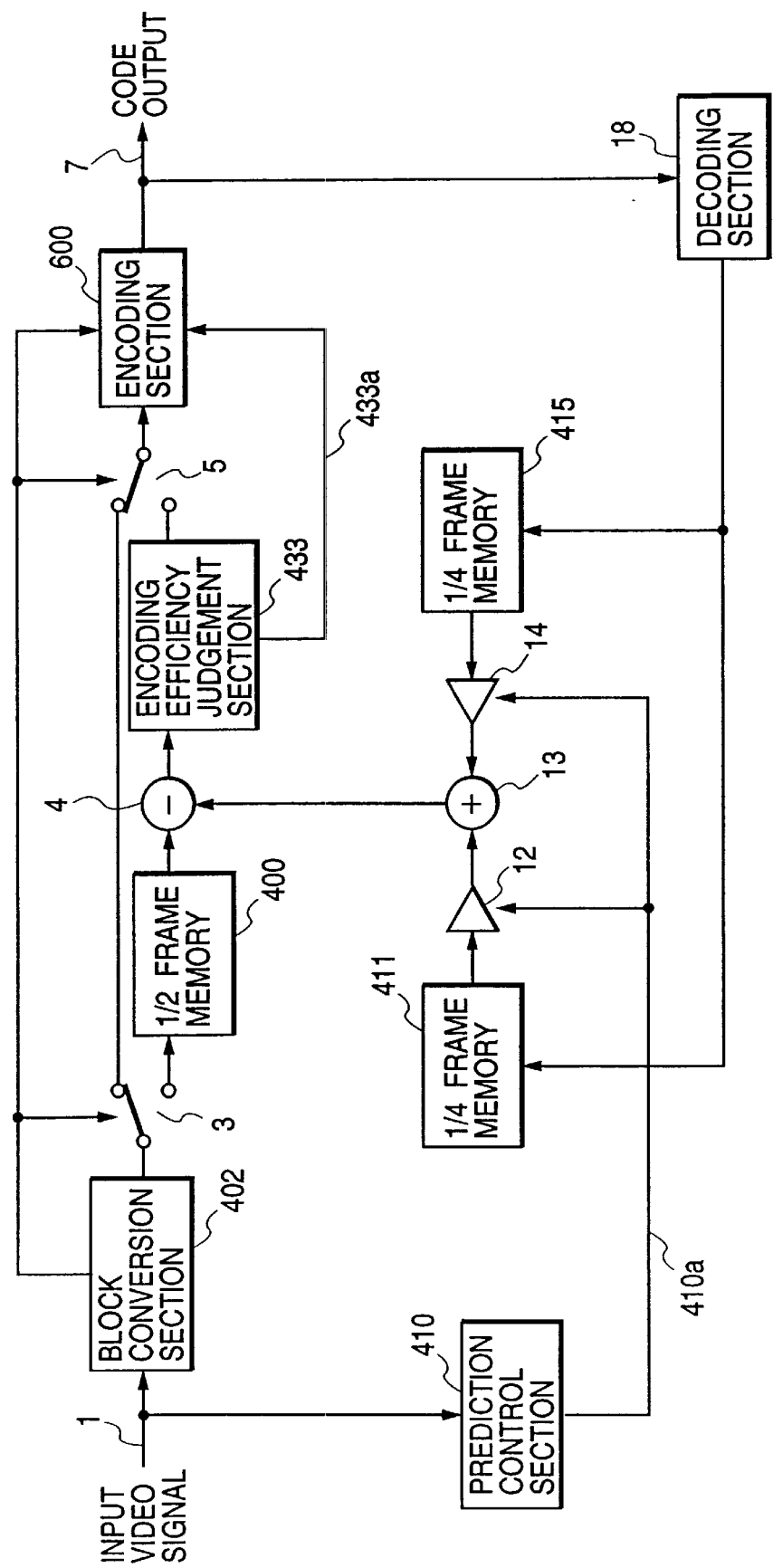
FIG. 13 is a general system block diagram of a third embodiment of an inter-block interpolative prediction encoding apparatus according to the present invention, whereby each of respective prediction blocks is enclosed at top and bottom and to the right and left between adjacent independently encoded blocks.

Another embodiment of an inter-block interpolative prediction encoding apparatus according to the present invention will be described referring to the general system block diagram of FIG. 13, in conjunction with the block arrangement diagrams of FIG. 15. In FIG. 13, components having identical functions to components of the preceding inter-block interpolative prediction encoding apparatus embodiments are designated by identical reference numerals to those of the preceding embodiments, and detailed description of these will be omitted. In FIG. 13, an input digital video signal is supplied via an input terminal 1 to a block conversion section 402 and a prediction control section 410, with the pixel values of each of respective images expressed by the video signal being successively output in a predetermined sequence as respective blocks of pixel values. These consist of independent blocks and prediction blocks, with the arrangement of these being illustrated in diagram (A) of FIG. 15, which conceptually shows a first basic operating step of this embodiment, in which all of the independent blocks (each designated as "independent") are sequentially read out from the block conversion section 402. As can be understood, with this embodiment, when the pixel values of an image which is to be encoded are arranged into an array of blocks, alternate ones of these blocks along the row direction and along the column direction of that array are predetermined as independent blocks and the remaining blocks predetermined as prediction blocks, to form a checkerboard configuration in which each prediction block is enclosed at the right and left sides and the upper and lower sides thereof between four independent blocks.

In step 1 of the operation for encoding an image, the switches 3 and 5 are controlled by the block conversion section 402 to transfer the respective sets of pixel values of the independent blocks to be successively encoded by the encoding section 600. The respective code portions thereby derived for the independent blocks are supplied to the output terminal 7 and also to the decoding section 18, which outputs corresponding sets of reconstructed pixel values.

In diagram (A) of FIG. 15, the letters A and B are assigned to respective ones of the independent blocks, and the letter C to the prediction blocks. It should be understood that these block designations have no relationship to the block designations (i.e., A-blocks, B-blocks, C-blocks, D-blocks) of the preceding embodiments.

In the first step, all of the independent blocks of an image are successively read out from the block conversion section 402 and encoded in the sequence A, B, A, B, A, . . . Each set of reconstructed pixel values for an independent block of the A set, derived by the decoding section 18, is stored in a predetermined one of the two ¼ frame memories 411, 415, and it will be assumed that these sets of values are each stored in the ¼ frame memory 411. Each set of reconstructed pixel values derived for an independent block of the B set is stored in the other one of these memories, i.e., the ¼ frame memory 415. Since as can be understood from FIG. 15, the total number of independent blocks is one half of the total number of blocks constituting an image, the maximum amount of storage capacity required for each of the two memories 411, 415 is ¼ of that total, i.e. ¼ of a frame of the video signal. However in actuality, since only the reconstructed pixel values derived for the edge pixels of an independent block are utilized to derive interpolated pixel values for prediction blocks, it is only necessary to derive and store these reconstructed pixel values of the edge pixels (i.e. the two outer rows and two outer columns) of each of the independent blocks in the ¼ frame memories 411, 415.

When step 1 has been completed, so that all of the independent blocks have been encoded, transmitted, and the corresponding reconstructed pixel values stored in memory, a second basic operating step, step 2, is executed. Firstly, switches 3 and 5 are controlled such as to transfer output values from the block conversion section 402 to be stored in a ½ frame memory 400, and output values from an encoding efficiency judgement section 433 to be input to the encoding section 600. Values read out from the ½ frame memory 400 are supplied to one input of a prediction subtractor 4, whose output values are supplied to the encoding efficiency judgement section 433. Interpolated prediction values are derived from respective pairs of reconstructed pixel values read out from the ¼ frame memories 411, 415 respectively, by multipliers 12, 14 and adder 13 under the control of the prediction control section 410, in the same manner as described for the preceding inter-block interpolative prediction encoding apparatus embodiments. In the initial part of step 2, respective sets of pixel values for all of the prediction blocks C are read out successively from the block conversion section 402 and stored in the ½ frame memory 400. Since the prediction blocks constitute one half of the total number of blocks forming an image, the storage capacity required for the ½ frame memory 400 is one half of the number of pixels which form an image, i.e. one half of a video signal frame. When the pixel values of all of the prediction blocks have been stored in the ½ frame memory 400, pixel values of a first prediction block are successively read out from the ½ frame memory 400, in synchronism with outputting of corresponding interpolated pixel values from the adder 13. As can be understood from diagram (B) of FIG. 15, with each of the prediction blocks C being enclosed at the right and left sides and at the upper and lower sides thereof between opposing adjacent ones of the independent blocks, a predicted pixel value can be derived for each pixel of a prediction block by interpolation along the horizontal or the vertical direction. That is to say, it is possible to obtain a predicted pixel value for such a pixel as either a combination of two predicted values derived using each of these interpolation directions, as described for the A-blocks of the inter-block interpolative prediction encoding apparatus of FIG. 1 above, or to judge whether the horizontal or the vertical interpolation direction will provide optimum encoding efficiency, and select only the predicted values derived using that selected direction, as described for the A-blocks of the inter-block interpolative prediction encoding apparatus of FIG. 9 above. With the embodiment of FIG. 13 it is assumed that the method of selecting a single interpolation direction for encoding a prediction block, based on judgement of optimum encoding efficiency, is utilized.

This with the embodiment of FIG. 13, to encode a prediction block, a set of prediction error values for that block derived based on interpolation along the horizontal direction of the image (using opposing edge columns of reconstructed pixel values of the two independent blocks which enclose that prediction block at the right and left sides thereof, with each pair of reconstructed pixel values used to derive an interpolated value being read out from the ¼ frame memory 411 and the ¼ frame memory 415 respectively under the control of the prediction control section 410), and a set of prediction error values derived based on interpolation along the vertical direction (using opposing edge rows of reconstructed pixel values of the two independent blocks which enclose that prediction block at the upper and lower sides thereof) are respectively obtained from the prediction subtractor 4 and supplied to the encoding efficiency judgement section 433. The encoding efficiency judgement section 433 judges which of these sets of prediction error values will result in generation of the smaller amount of code, when encoded, and supplies the selected set to the encoding section 600 via the switch 5, while at the same time supplying data 433a indicative of the selected prediction direction to the encoding section 600. The prediction direction indication data are multiplexed with the generated code, by the encoding section 600, and supplied to the output terminal 7.

When a set of prediction error values for a prediction block are supplied to the encoding section 600, together with the corresponding interpolation direction indication data, the encoding section 600 applies one-dimensional DST processing to that set along the selected interpolation direction, followed by quantization of the DST coefficients and variable-length encoding. In the case of encoding the pixel values of an independent block, the encoding section 600 applies orthogonal DCT processing followed by quantization of the DCT coefficients and variable-length encoding.

The above processing is executed for each of the prediction blocks in succession, to thereby obtain and transmit successive code portions combined with corresponding interpolation direction indication data for each of the prediction blocks, and so complete the process of encoding the image.

Alternatively, as described for the A-blocks of the inter-block interpolative prediction encoding apparatus of FIG. 9, it would be possible to perform the encoding efficiency judgement, to determine the optimum direction of interpolation, based upon comparison of the degree of correlation between the two blocks which enclose a prediction block at the right and left sides thereof and the degree of correlation between the two blocks which enclose that prediction at the upper and lower sides thereof, i.e. with the pair of blocks which exhibit the higher degree of correlation being selected for use in the interpolation.

Figure 14:
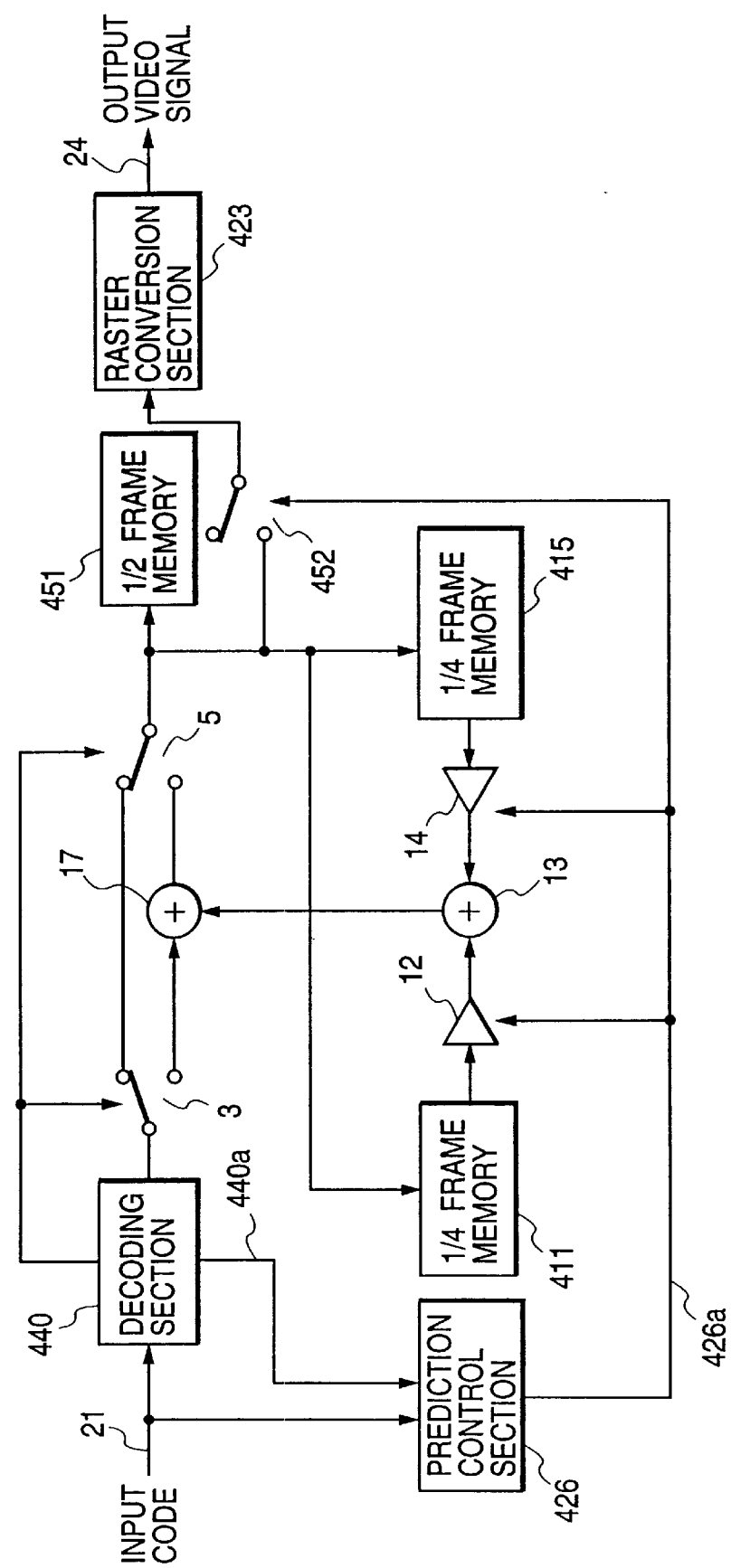
FIG. 14 is a general system block diagram of an embodiment of an inter-block interpolative prediction decoding apparatus corresponding to the inter-block interpolative prediction encoding apparatus of FIG. 13.

FIG. 14 is a general system block diagram of an embodiment of an inter-block interpolative prediction decoding apparatus corresponding to the inter-block interpolative prediction encoding apparatus of FIG. 13. A stream of code including interpolation direction indication data combined therein, which has been generated by the apparatus of FIG. 13, is supplied via an input terminal 21 to a decoding section 440 and to a prediction control section 426. When code of an independent block is being received, the 440 controls the switches 3, 5 to transfer the resultant decoded pixel values to be temporarily held in a ½ frame memory 451, and also in one of the ¼ frame memories 411 or 415. Thus, all of the independent blocks of an image are successively decoded, in the same sequence in which the blocks were output from the block conversion section 402 of the encoding apparatus, and temporarily stored in the ½ frame memory 451, while also being stored in either the ¼ frame memory 411 or the ¼ frame memory 415, in the same manner as described for the encoding apparatus of FIG. 13. Next, the decoding section 440 sets the switches 3, 5 to transfer the output of the decoding section 440 to the prediction adder 17 and the output of the prediction adder 17 to the ½ frame memory 451, as the set of prediction error values for the first prediction block of the image to have been encoded are decoded by the decoding section 440 and supplied to the prediction adder 17. In synchronism with this, the corresponding predicted pixel values for that prediction block are derived by interpolation, in the same manner as described for the encoding apparatus of FIG. 13, and supplied to the prediction adder 17, with the resultant reconstructed pixel values for that prediction block being successively stored in the ½ frame memory 451.

At that time, the pixel values of the first independent block (i.e., in FIG. 15, the uppermost left-side block) start to be read out from the ½ frame memory 451 and input to the raster conversion section 423. When that is completed, the pixel values of the prediction block which has just been decoded are read out from the ½ frame memory 451 and transferred to the raster conversion section 423. Decoding of the next prediction block is then executed, and the above process repeated. In that way, the array of blocks shown in FIG. 15 can be supplied to the raster conversion section 423 as successive blocks along successive rows of that array, i.e., in the sequence A, C, B, C, A, . . . , thereby enabling the configuration and operation of the raster conversion section 423 to be simplified. The raster conversion section 423 operates on the complete set of blocks for an image, received in that way, to recover a raster-scan video signal, which is supplied to the output terminal 24.

As can be understood from the above description of embodiments, the present invention provides the following advantages. Firstly, in the case of the inter-block interpolative prediction encoding apparatus embodiment of FIG. 13, the number of independently encoded blocks which are utilized to encode an image constitutes only one half of the total number of pixels of that image, with the remaining pixel values being encoded using interpolative prediction based on the independent blocks. Hence, a substantial increase in encoding efficiency (or, in the case of an encoding apparatus in which the output data rate is controlled to be constant, a corresponding improvement in image reproduction quality) can be achieved, by comparison with a prior art type of encoding apparatus in which all blocks of an image are intra-coded. However since interpolation is applied, between two adjacent blocks disposed at the right and left sides respectively, and/or between two adjacent blocks disposed at the upper and lower sides respectively of a block for which interpolated pixel values are derived, a substantially higher accuracy of prediction can be achieved than is possible with an encoding apparatus which utilizes extrapolative prediction to achieve inter-block encoding.

Furthermore in the case of the inter-block interpolative prediction encoding apparatus embodiment of FIG. 1, an even greater improvement of encoding efficiency can be achieved, since the number of independent blocks is only one quarter of the total number of blocks constituting an image. This is made possible by processing each of successive sets of four blocks by encoding one of the blocks as an independent block, encoding two of the remaining blocks by interpolative prediction using the reconstructed pixel values of that encoded independent block and of two previously encoded adjacent independent blocks, and encoding the fourth block by interpolative prediction using reconstructed pixel values of the two prediction blocks which have just been encoded and of two adjacent previously encoded blocks.

Furthermore, encoding efficiency is further improved by encoding each of the sets of prediction error values derived for respective prediction blocks by applying one-dimensional DST processing to that set of values (i.e., operated on as an array) along the same direction as that along which interpolation was performed when obtaining that set of prediction error values.

Moreover in the case of a prediction block for which interpolated pixel values can be derived using either of two different interpolation directions, the invention enables an inter-block interpolative prediction encoding apparatus to be provided whereby judgement is performed as to which of these directions will result in the higher degree of encoding efficiency, with that interpolation direction then being selected to be utilized.

Moreover with the present invention, the effects of any code error which arises in the course of data transmission (or recording/reproduction processing) between the encoding apparatus and the inter-block interpolative prediction decoding apparatus will be limited to the block in which the error arises and, at most, one or two adjacent blocks of that image. Hence, such code errors will have a much smaller adverse effect upon the reproduced images than is the case with a method such as extrapolative prediction of pixel values, with which the effects of a code error can propagate throughout a number of blocks of an image.

What is claimed is:

1. An inter-block interpolative prediction encoding apparatus for dividing an image into block units, and executing sequential encoding processing, comprising:
    first encoding means for deriving code by independent intra-block encoding of an independent block which is separate from blocks which have already been encoded, and for executing local decoding of said code to obtain a decoded image,
    first prediction means for generating first interpolative prediction signal values for respective pixels within first prediction blocks, from decoded images of said blocks which have already been encoded and of said independent block, said first prediction blocks being sandwiched at the top and bottom or to the left and right between said blocks which have already been encoded and said independent block,
    second encoding means for deriving code by encoding prediction error signal values which are obtained by subtracting said first interpolative prediction signal values from respective values of said pixels within said first prediction blocks, and for executing local decoding of said code to obtain decoded images,
    second prediction means for generating respective second interpolative prediction signal values for pixels within a second prediction block, from decoded images of blocks which have already been encoded and are located above and below or to the left and the right of said second prediction block and from said decoded images of said first prediction blocks, said second prediction block being sandwiched at top and bottom and to the left and right between said blocks which have already been encoded and said first prediction blocks, and
    third encoding means for subtracting said second interpolative prediction signal values from respective values of pixels within said second prediction block, to obtain prediction error signal values, and for encoding said prediction error signal values.

2. An inter-block interpolative prediction encoding apparatus according to claim 1, wherein encoding and decoding of a prediction block are executed in accordance with a direction in which interpolative prediction is applied to that block, with one-dimensional Discrete Sine Transform processing being applied along the vertical direction and one-dimensional Discrete Cosine Transform processing being applied along the horizontal direction, in the case of interpolative prediction along the vertical direction, and with one-dimensional Discrete Sine Transform processing being applied along the horizontal direction and one-dimensional Discrete Cosine Transform processing being applied along the vertical direction in the case of interpolative prediction along the horizontal direction.

3. An inter-block interpolative prediction decoding apparatus for dividing an image into block units, and executing sequential decoding processing, comprising:
    first decoding means for deriving a decoded image by independent intra-block decoding of an independent block which is separated from blocks which have already been encoded,
    first prediction means for generating first interpolative prediction signal values for respective pixels of first prediction blocks from decoded images of said blocks which have been already decoded and of said independent block, where each of said first prediction blocks is sandwiched at the top and bottom, or to the left and right, between said decoded blocks and said independent block,
    second decoding means for decoding respective prediction error signal values for pixels of the first prediction block, to obtain decoded prediction error signal values, and adding said decoded prediction error signal values to respective ones of said first interpolative prediction signal values to thereby obtain decoded images,
    second prediction means for generating second interpolative prediction signal values for respective pixels of a second prediction block from decoded images of said blocks which have already been decoded and from said decoded images of said first prediction blocks, said second prediction block being sandwiched at top and bottom and to the left and right between said blocks which have already been decoded and said first prediction blocks, and third decoding means for decoding prediction error signal values for said second prediction block, to obtain decoded prediction error signal values, and for adding said decoded prediction error signal values to respective ones of said second interpolative prediction signal values to obtain a decoded image.

4. An inter-block predictive encoding apparatus according to claim 3, wherein decoding of a prediction block are executed in accordance with a direction in which interpolative prediction is applied to that block, with one-dimensional Discrete Sine Transform processing being applied along the vertical direction and one-dimensional Discrete Cosine Transform processing being applied along the horizontal direction, in the case of interpolative prediction along the vertical direction, and with one-dimensional Discrete Sine Transform processing being applied along the horizontal direction and one-dimensional Discrete Cosine Transform processing being applied along the vertical direction in the case of interpolative prediction along the horizontal direction.

5. An inter-block interpolative prediction encoding method for dividing an image into block units, and executing sequential encoding processing, comprising:

deriving a first code by independent intra-block encoding of an independent block which is separated from blocks which have already been encoded, and executing local decoding of said code to obtain a decoded image, generating respective first interpolative prediction signal values for respective pixels of first prediction blocks, from decoded images of said blocks which have already been encoded and said independent block, said first prediction blocks each being sandwiched at top and bottom or to the left and right between said blocks which have already been encoded and said independent block, deriving a second code by encoding prediction error signal values which are obtained by subtracting said first interpolative prediction signal values from respective values of said pixels of said first prediction blocks, executing local decoding of said second code to obtain decoded images, generating respective second interpolative prediction signal values for pixels of a second prediction block, from decoded images of said blocks which have already been encoded, said second prediction block being sandwiched at top and bottom and to the left and right between said blocks which have already been encoded and said first prediction blocks, subtracting said second interpolative prediction signal values from respective values of said pixels of second prediction block, to obtain corresponding prediction error signal values, and encoding said prediction error signal values to obtain a third code.

6. An inter-block interpolative prediction encoding method according to claim 5, wherein encoding and decoding of a prediction block is executed in accordance with a direction in which interpolative prediction is applied to that block, with one-dimensional Discrete Sine Transform processing being applied along the vertical direction and one-dimensional Discrete Cosine Transform processing being applied along the horizontal direction, in the case of interpolative prediction along the vertical direction, and with one-dimensional Discrete Sine Transform processing being applied along the horizontal direction and one-dimensional Discrete Cosine Transform processing being applied along the vertical direction in the case of interpolative prediction along the horizontal direction.

7. An inter-block interpolative prediction decoding method for dividing an image into block units, and executing sequential decoding processing, comprising:

deriving a first decoded image by independent intra-block decoding of an independent block which is separated from blocks which have already been decoded, generating respective first interpolative prediction signal values for pixels of first prediction blocks, from decoded images of said blocks which have already been decoded and of said independent block, each of said first prediction blocks being sandwiched at top and bottom or to the left and right between said blocks which have already been encoded and said independent block, decoding respective prediction error signal values of the first prediction blocks, to obtain decoded prediction error signal values, and adding said decoded prediction error signal values to corresponding ones of said first interpolative prediction signal values to obtain second decoded images, generating respective second interpolative prediction signal values for pixels of a second prediction block, from decoded images of said blocks which have already been decoded and from said decoded images of said first prediction blocks, said second prediction block being sandwiched at top and bottom and to the right and left between said blocks which have already been decoded and said first prediction blocks, decoding respective prediction error signal values for pixels of said second prediction block, to obtain decoded prediction error signal values, and adding said decoded prediction error signal values to said second interpolative prediction signal values to obtain a third decoded image.

8. An inter-block interpolative prediction decoding method according to claim 7, wherein decoding of a prediction block is executed in accordance with a direction in which interpolative prediction is applied to that block, with one-dimensional Discrete Sine Transform processing being applied along the vertical direction and one-dimensional Discrete Cosine Transform processing being applied along the horizontal direction, in the case of interpolative prediction along the vertical direction, and with one-dimensional Discrete Sine Transform processing being applied along the horizontal direction and one-dimensional Discrete Cosine Transform processing being applied along the vertical direction in the case of interpolative prediction along the horizontal direction.

9. An inter-block adaptive interpolative prediction encoding apparatus for dividing an image into units of blocks, executing independent internal encoding of part of said blocks and encoding remaining ones of said blocks by inter-block prediction, the apparatus comprising first encoding means for executing encoding of blocks which are disposed at the top and bottom and to the right and left of respective adaptive prediction blocks which constitute part or all of said prediction blocks, to obtain resultant code, and for executing decoding of said code to obtain respectively decoded images, adaptive subtractor means for judging an appropriate prediction direction, based upon said decoded images of said blocks disposed at the top and bottom and to the right and left of said adaptive prediction block, for thereby deriving, for each pixel within said adaptive prediction block, a vertical interpolative prediction signal value based on said decoded images of said blocks disposed at the top and bottom, and a horizontal interpolative prediction signal value based on said decoded images of said blocks disposed to the right and left, selecting one of said interpolative prediction signal values based upon results of said judgement of prediction direction, subtracting each said interpolative prediction signal value from a corresponding value of a pixel within said adaptive prediction block to obtain a prediction error signal value, and second encoding means for executing encoding of said prediction error signal values to obtain resultant code.

10. An inter-block adaptive interpolative prediction encoding apparatus according to claim 9, wherein all of said prediction blocks are adaptive prediction blocks, and wherein said adaptive prediction subtractor means comprises prediction means for deriving, for each pixel of an adaptive prediction block which is sandwiched at top and bottom and left and right sides thereof between respective ones of said independent blocks, a vertical interpolative prediction signal value from said decoded images of said independent blocks disposed to the top and bottom and a horizontal interpolative prediction signal value from said decoded images of said independent blocks disposed to the left and right sides, prediction subtractor means for subtracting each said vertical interpolative prediction signal value from a corresponding value of a pixel within said adaptive prediction block to thereby obtain a corresponding vertical prediction error signal value, and for subtracting each said horizontal interpolative prediction signal value from a corresponding value of a pixel within said adaptive prediction block to thereby obtain a corresponding horizontal prediction error signal value, and encoding efficiency judgement means for estimating respective encoding efficiencies for said vertical prediction error signal values and said horizontal prediction error signal values and selecting the prediction error signal values which will result in generation of a smaller amount of code.

11. An inter-block adaptive interpolative prediction encoding apparatus according to claim 9, wherein each said independent block is disposed separated from blocks which have already been encoded, and wherein said prediction blocks consist of non-adaptive prediction blocks each of which is sandwiched at top and bottom or to the right and left between said blocks which have already been encoded and said independent blocks and of adaptive prediction blocks each of which is sandwiched at top and bottom and to the right and left between said blocks which have already been encoded and said independent blocks.

12. An inter-block interpolative prediction decoding apparatus for performing independent block predictive decoding of an image which has been encoded by being divided into block units, with part of the blocks being independent blocks which are independently internally encoded and remaining blocks being prediction blocks which are predictively encoded, the apparatus comprising first decoding means for executing decoding of blocks disposed at top and bottom and left and right sides of each of respective adaptive prediction blocks which constitute part or all of said prediction blocks, prediction judgement means for estimating a prediction direction for each of said adaptive prediction blocks, to obtain judgement information, prediction means for deriving an interpolative prediction signal value for each pixel within said adaptive prediction block by selecting, based on said judgement information, either a vertical interpolative prediction signal value obtained using decoded images of said blocks at top and bottom or a horizontal interpolative prediction signal value obtained using decoded images of said blocks at left and right, and second decoding means for executing decoding of prediction error signal values of said adaptive prediction block to obtain decoded prediction error signal values, adding said decoded prediction error signal values to said interpolative prediction signal values to obtain a decoded image.

13. An inter-block interpolative prediction decoding apparatus according to claim 12 wherein said independent block is separated from blocks which have already been encoded and wherein said prediction blocks consist of non-adaptive prediction blocks each sandwiched at top and bottom or to the right and left sides between said blocks which have already been decoded and said independent blocks, and adaptive prediction blocks each sandwiched at top and bottom and to the left and right sides between said blocks which have already been decoded and said independent blocks.

14. An inter-block adaptive interpolative prediction encoding method for dividing an image into units of blocks, executing independent internal encoding of part of said blocks and encoding remaining ones of said blocks by inter-block prediction, comprising executing encoding of blocks which are disposed at the top and bottom and to the right and left of respective adaptive prediction blocks which constitute part or all of said prediction blocks, to obtain resultant code, and executing decoding of said code to obtain respectively decoded images, judging an appropriate prediction direction, based upon said decoded images of said blocks disposed at the top and bottom and to the right and left of said adaptive prediction block, for thereby deriving, for each pixel within said adaptive prediction block, a vertical interpolative prediction signal value based on said decoded images of said blocks disposed at the top and bottom, and a horizontal interpolative prediction signal value based on said decoded images of said blocks disposed to the right and left, selecting one of said interpolative prediction signal values based upon results of said judgement of prediction direction, and subtracting each interpolative prediction signal value thus selected from a corresponding value of a pixel within said adaptive prediction block to obtain a prediction error signal value, and executing encoding of said prediction error signal values to obtain resultant code.

15. An inter-block adaptive interpolative prediction encoding method according to claim 14, wherein all of said prediction blocks are processed as adaptive prediction blocks, and comprising deriving, for each pixel of an adaptive prediction block which is sandwiched at top and bottom and left and right sides thereof between respective independent blocks, a vertical interpolative prediction signal value from said decoded images of said independent blocks disposed at the top and bottom and a horizontal interpolative prediction signal value from said decoded images of respective decoded images of said independent blocks disposed to the left and right sides, subtracting each said vertical interpolative prediction signal value from a corresponding value of a pixel within said adaptive prediction block to thereby obtain a corresponding vertical prediction error signal value, and for subtracting each said horizontal interpolative prediction signal value from a corresponding value of a pixel within said adaptive prediction block to thereby obtain a corresponding horizontal prediction error signal value, and estimating respective encoding efficiencies for said vertical prediction error signal values and said horizontal prediction error signal values and selecting the prediction error signal values which will result in generation of a smaller amount of code.

16. An inter-block adaptive interpolative prediction encoding method according to claim 14, wherein each said independent block is disposed separated from blocks which have already been encoded, and wherein said prediction blocks are processed as non-adaptive prediction blocks each of which is sandwiched at top and bottom or to the right and left between said blocks which have already been encoded and said independent blocks, and as adaptive prediction blocks each of which is sandwiched at top and bottom and to the right and left between said blocks which have already been encoded and said independent blocks.

17. An inter-block adaptive interpolative prediction decoding method for performing independent block predictive decoding of an image which has been encoded by being divided into block units, with part of the blocks being independent blocks which are independently internally encoded and remaining blocks being prediction blocks which are predictively encoded, comprising executing decoding of blocks disposed at top and bottom and left and right sides of each of respective adaptive prediction blocks which constitute part or all of said prediction blocks, estimating an appropriate prediction direction for each of said adaptive prediction blocks, to obtain judgement information, a deriving an interpolative prediction signal value for each pixel within said adaptive prediction block by selecting, based on said judgement information, either a vertical interpolative prediction signal value obtained using decoded images of said blocks at top and bottom or a horizontal interpolative prediction signal value obtained using decoded images of said blocks at left and right, and executing decoding of prediction error signal values of said adaptive prediction block to obtain decoded prediction error signal values, and adding said decoded prediction error signal values to said interpolative prediction signal values to obtain a decoded image.

18. An inter-block adaptive interpolative prediction decoding method according to claim 17 wherein each said independent block is separated from blocks which have already been encoded and wherein said prediction blocks consist of non-adaptive prediction blocks each sandwiched at top and bottom or to the right and left sides between said blocks which have already been decoded and said independent blocks, and adaptive prediction blocks each sandwiched at top and bottom and to the left and right sides between said blocks which have already been decoded and said independent blocks.

19. An inter-block interpolative prediction encoding apparatus for encoding an image expressed as an array of pixels by dividing said image into a plurality of blocks of pixels, the apparatus comprising block conversion means (2) for receiving respective pixel signal values corresponding to said pixels and outputting said pixel signal values arranged as a sequence of sets of pixel signal values respectively corresponding to said blocks, with specific ones of said blocks being predetermined as independent blocks which are to be independently internally encoded and remaining ones of said blocks predetermined as prediction blocks which are to be predictively encoded, subtractor means (4) for subtracting from each pixel signal value of each of said prediction blocks a corresponding predicted pixel signal value, to obtain a corresponding prediction error signal value, encoding means (6) for encoding said sets of pixel signal values corresponding to said independent blocks to obtain corresponding code portions, and for encoding respective sets of said prediction error signal values derived for said prediction blocks to obtain corresponding code portions, decoding means (18) for decoding each of said code portions corresponding to said independent blocks to obtain a corresponding set of reconstructed reconstructed pixel signal values, and for decoding each of said code portions corresponding to said sets of prediction error signal values corresponding to said prediction blocks to obtain a corresponding set of reconstructed prediction error signal values, adder means (17) for adding to each of said reconstructed prediction error signal values a corresponding predicted pixel signal value, to obtain a corresponding reconstructed pixel signal value, memory means (9, 11, 15) for storing said reconstructed pixel signal values, interpolative prediction means (8, 12, 13, 14, 20) for reading out specific ones of said reconstructed pixel signal values from said memory means and operating thereon to derive respective ones of said prediction pixel signal values by interpolation, with said interpolation being executed based upon said reconstructed pixel signal values corresponding to said independent blocks.

20. An inter-block interpolative prediction encoding apparatus according to claim 19, wherein said sequence of blocks is predetermined such that when a set of pixel signal values corresponding to an independent block is produced from said block conversion means said independent block is separated by a spacing of one block in a horizontal direction of said image and one block in a vertical direction of said image, from a region formed of blocks which have already been encoded, and wherein said interpolative prediction means (8, 12, 13, 14, 20) comprises means for operating on prediction blocks which are adjacent to each said independent block (D) by executing interpolation along said vertical direction to derive a predicted pixel signal value, for each pixel signal value of a first prediction block (B) which is enclosed at top and bottom thereof between said independent block (D) and a block of said region which has already been encoded, by utilizing respective pixel signal values of said independent block (D) and said block of the already encoded region, executing interpolation along said horizontal direction to derive a predicted pixel signal value, for each pixel signal value of a second prediction block (C) which is enclosed at a left side and right side thereof between said independent block (D) and a block of said region which has already been encoded, by utilizing respective pixel signal values of said independent block and said block of the already encoded region, and upon completion of encoding of said first and second prediction blocks, executing interpolation along said vertical direction to derive a first predicted pixel signal value, for each pixel signal value of a third prediction block (A) which is enclosed at top and bottom thereof between a first block of said already encoded region and said second prediction block (B) and is enclosed at right and left sides thereof between said first prediction block (C) and a second block of said already encoded region, by utilizing respective pixel signal values of said second prediction block (B) and said first block of the already encoded region, executing interpolation along said horizontal direction for said each pixel signal value of the third prediction block (A) to derive a second predicted pixel signal value, by utilizing respective pixel signal values of said first prediction block and said second block of the already encoded region, and combining said first predicted pixel signal value and second predicted pixel signal value in a predetermined manner to obtain a combined predicted pixel signal value for said each pixel signal value of the third prediction block.

21. An inter-block interpolative prediction encoding apparatus according to claim 20, wherein said encoding means (6) comprises means (200, 201, 202, 203, 206) for applying one-dimensional Discrete Sine Transform processing along said vertical direction to each set of said prediction error signal values which are derived for each of said first prediction blocks (B) by interpolation along said vertical direction, and applying one-dimensional Discrete Cosine Transformprocessing to said set along said horizontal direction, applying said one-dimensional Discrete Sine Transform processing along said horizontal direction to each set of said prediction error signal values which are derived for each of said second prediction blocks (C) by interpolation along said horizontal direction, and applying one-dimensional Discrete Cosine Transform processing to said set along said vertical direction, and applying orthogonal processing to each set of said combined prediction error signal values which are derived for each of said third prediction blocks (A).

22. An inter-block interpolative prediction decoding apparatus for operating on said code generated by encoding of an image by the inter-block interpolative prediction encoding apparatus of claim 19, comprising decoding means (22) for decoding said code portions corresponding to said independent blocks to obtain respectively corresponding sets of pixel signal values of a reconstructed independent block, and for decoding said code portions corresponding to said sets of prediction error signal values derived respectively for said prediction blocks, to obtain corresponding sets of reconstructed prediction error signal values, adder means (17) for adding to each of said reconstructed prediction error signal values a corresponding predicted pixel signal value, to obtain a corresponding reconstructed pixel signal value, memory means (9, 11, 15) for storing said reconstructed pixel signal values, and interpolative prediction means (8, 12, 13, 14, 20) for reading out specific ones of said reconstructed pixel signal values from said memory means and operating thereon to derive respective ones of said prediction pixel signal values by interpolation, said interpolative prediction means comprising means for operating on prediction blocks which are adjacent to each said reconstructed independent block by executing interpolation along said vertical direction to obtain a predicted pixel signal value, for each pixel signal value of a first prediction block which is enclosed at top and bottom thereof between said independent block and a block of a region which has already been decoded, by utilizing respective pixel signal values of said reconstructed independent block and said block of the already decoded region, executing interpolation along said horizontal direction to obtain a predicted pixel signal value, for each pixel signal value of a second prediction block which is enclosed at a left side and right side thereof between said reconstructed independent block and a block of said region which has already been decoded, by utilizing respective pixel signal values of said reconstructed independent block and said block of the already decoded region, and upon completion of decoding of said first and second prediction blocks, executing interpolation along said vertical direction to derive a first predicted pixel signal value, for each pixel signal value of a third prediction block which is enclosed at top and bottom thereof between a first block of said already decoded region and said second prediction block and is enclosed at right and left sides thereof between said first prediction block and a second block of said already decoded region, by utilizing respective pixel signal values of said second prediction block and said first block of the already decoded region, executing interpolation along said horizontal direction for said each pixel signal value of the third prediction block to derive a second predicted pixel signal value, by utilizing respective pixel signal values of said first prediction block and said second block of the already decoded region, and combining said first predicted pixel signal value and second predicted pixel signal value in said predetermined manner to obtain a combined predicted pixel signal value for said each pixel signal value of the third prediction block.

23. An inter-block interpolative prediction encoding apparatus according to claim 19 further comprising encoding efficiency judgement means (33), wherein said sequence of blocks is predetermined such that when a set of pixel signal values corresponding to an independent block is produced from said block conversion means said independent block is separated by a spacing of one block, in a horizontal direction and a vertical direction of said image, from a region formed of blocks which have already been encoded, and wherein said interpolative prediction means (8, 12, 13, 14, 20) comprises means for operating on prediction blocks which are adjacent to each said independent block by executing interpolation along said vertical direction to obtain a predicted pixel signal value, for each pixel signal value of a first prediction block which is enclosed at top and bottom thereof between said independent block and a block of said region which has already been encoded, by utilizing respective pixel signal values of said independent block and said block of the already encoded region, executing interpolation along said horizontal direction to obtain a predicted pixel signal value, for each pixel signal value of a second prediction block which is enclosed at a left side and right side thereof between said independent block and a block of said region which has already been encoded, by utilizing respective pixel signal values of said independent block and said block of the already encoded region, and upon completion of encoding of said first and second prediction blocks, executing interpolation along said vertical direction to derive a vertical predicted pixel signal value, for each pixel signal value of a third prediction block which is enclosed at top and bottom thereof between a first block of said already encoded region and said second prediction block and is enclosed at right and left sides thereof between said first prediction block and a second block of said already encoded region, by utilizing respective pixel signal values of said second prediction block and said first block of the already encoded region, to thereby obtain from said subtractor means (4) a set of vertical prediction error signal values corresponding to said third prediction block, and executing interpolation along said horizontal direction for said each pixel signal value of the third prediction block to derive a horizontal predicted pixel signal value, by utilizing respective pixel signal values of said first prediction block and said second block of the already encoded region, to thereby obtain from said subtractor means (4) a set of horizontal prediction error signal values corresponding to said third prediction block, and wherein said encoding efficiency judgement means (33) operates on said set of vertical prediction error signal values and said set of horizontal prediction error signal values to determine one of said sets which, when encoded, will result in a smaller amount of generated code, controls said selection means to select said set which will result in generation of the smaller amount of code, to be transferred to said encoding means (600) for encoding, generates prediction direction information corresponding to said selected set, and supplies said prediction direction information to said encoding means (600) to be combined with said code which is generated by said encoding means.

24. An inter-block interpolative prediction encoding apparatus according to claim 23, wherein said encoding means (6) comprises means (200, 201, 202, 203, 206) for applying one-dimensional Discrete Sine Transform processing along said vertical direction to each set of said prediction error signal values which are derived for each of said first prediction blocks (B) by interpolation along said vertical direction, and applying one-dimensional Discrete Cosine Transform processing to said set along said horizontal direction, applying said one-dimensional Discrete Sine Transform processing along said horizontal direction to each set of said prediction error signal values which are derived for each of said second prediction blocks (C) by interpolation along said horizontal direction, and applying one-dimensional Discrete Cosine Transform processing to said set along said vertical direction, and when said vertical set of prediction error signal values is selected for said third prediction block (A) by said selection means, applying said one-dimensional Discrete Sine Transform to said set along said vertical direction and applying said one-dimensional Discrete Cosine Transform processing to said set along said horizontal direction, and when said horizontal set of prediction error signal values is selected for said third prediction block (A) by said selection means, applying said one-dimensional Discrete Sine Transform processing to said set along said horizontal direction and applying said one-dimensional Discrete Cosine Transform processing to said set along said vertical direction.

25. An inter-block interpolative prediction decoding apparatus for operating on said code generated by encoding of an image by the inter-block interpolative prediction encoding apparatus of claim 23, comprising decoding means (45) for separating said prediction direction information from said code, for decoding said code corresponding to said independent blocks to obtain respectively corresponding sets of pixel signal values of a reconstructed independent block, and for decoding said code corresponding to of said sets of prediction error signal values derived respectively for said prediction blocks, to obtain corresponding sets of reconstructed prediction error signal values, adder means (17) for adding to each of said reconstructed prediction error signal values a corresponding predicted pixel signal value, to obtain a corresponding reconstructed pixel signal value, memory means (9, 11, 15) for storing said reconstructed pixel signal values, and interpolative prediction means (prediction control section 47, 12, 13, 14) for reading out specific ones of said reconstructed pixel signal values from said memory means and operating thereon to derive respective ones of said prediction pixel signal values by interpolation, said interpolative prediction means comprising means for operating on prediction blocks which are adjacent to each said reconstructed independent block by executing interpolation along said vertical direction to obtain a predicted pixel signal value, for each pixel signal value of a first prediction block which is enclosed at top and bottom thereof between said independent block and a block of a region which has already been decoded, by utilizing respective pixel signal values of said reconstructed independent block and said block of the already decoded region, executing interpolation along said horizontal direction to obtain a predicted pixel signal value, for each pixel signal value of a second prediction block which is enclosed at a left side and right side thereof between said reconstructed independent block and a block of said region which has already been decoded, by utilizing respective pixel signal values of said reconstructed independent block and said block of the already decoded region, and upon completion of decoding of said first and second prediction blocks, executing interpolation along a direction specified by said prediction direction information to derive a predicted pixel signal value for each pixel signal value of a third prediction block which is enclosed at top and bottom thereof between a first block of said already decoded region and said second prediction block and is enclosed at right and left sides thereof between said first prediction block and a second block of said already decoded region, by utilizing respective pixel signal values of one of said blocks of the already decoded region and an opposing one of said first prediction block and second prediction block.

26. An inter-block interpolative prediction encoding apparatus for encoding an image expressed as an array of pixels by dividing said image into an array of blocks of pixels, the apparatus comprising block conversion means (402) for receiving respective pixel signal values corresponding to said pixels and outputting said pixel signal values arranged as sets of pixel signal values respectively corresponding to said blocks, with specific ones of said blocks being predetermined as independent blocks which are to be independently internally encoded and remaining ones of said blocks predetermined as prediction blocks which are to be predictively encoded, with said independent blocks occurring in alternation with respective ones of said prediction blocks along each of respective rows and columns of said array of blocks, first memory means (400) for receiving and storing all of respective pixel signal values of said prediction blocks, in an initial stage of operation which is executed prior to encoding of said prediction blocks, subtractor means (4) for subtracting from each pixel signal value of said prediction blocks a corresponding predicted pixel signal value, to obtain a corresponding prediction error signal value, encoding means (18) for encoding said sets of pixel signal values corresponding to said independent blocks to obtain corresponding code portions, and for encoding selected sets of pixel signal values corresponding to said prediction blocks to obtain corresponding code portions, encoding efficiency judgement means (433) for operating on said prediction error signal values to judge respective amounts of code which will be generated by encoding specific ones of said sets of prediction error signal values, and for controlling transfer of said sets of prediction error signal values to be encoded by said encoding means (600), in accordance with judgement results obtained thereby, decoding means (18) for decoding said code portions corresponding to each of said independent blocks to obtain a corresponding set of reconstructed pixel signal values, second memory means (411, 415) for storing all of said reconstructed pixel signal values during said initial stage of operation, and interpolative prediction means (410, 12, 13, 14) for controlling read-out of said prediction blocks and reconstructed independent blocks from said first and second memory means in a predetermined sequence, and for operating on each of said prediction blocks by executing interpolation along said vertical direction to derive a vertical predicted pixel signal value corresponding to each pixel of said prediction block by utilizing respective pixel signal values of a first independent block and second independent block which are disposed adjacent to upper and lower sides of said prediction block respectively, to thereby obtain from said subtractor means (4) a set of vertical prediction error signal values corresponding to said prediction block, executing interpolation along said horizontal direction for said each pixel signal value of the prediction block to derive a horizontal predicted pixel signal value, by utilizing respective pixel signal values of a third independent block and fourth independent block which are disposed at said right and left sides of said prediction block respectively, to thereby obtain from said subtractor means (4) a set of horizontal prediction error signal values corresponding to said prediction block, and wherein said encoding efficiency judgement means (433) operates on said set of vertical prediction error signal values and said set of horizontal prediction error signal values to determine one of said sets which, when encoded, will result in a smaller amount of generated code, selects said one of the set of vertical prediction error signal values and set of horizontal prediction error signal values which will result in generation of the smaller amount of code, to be transferred to said encoding means (600) for encoding, generates prediction direction information indicative of the one of said sets of vertical prediction error signal values and horizontal prediction error signal values that has been selected, and supplies said prediction direction information to said encoding means (600) to be combined with said code which is generated by said encoding means.

27. An inter-block interpolative prediction encoding apparatus according to claim 26 wherein said encoding means (600) comprises means functioning, when said vertical set of prediction error signal values is selected for said prediction block by said encoding efficiency judgement means (433), to apply said one-dimensional Discrete Sine Transform to said set along said vertical direction and apply said one-dimensional Discrete Cosine Transform processing to said set along said horizontal direction, and, when said horizontal set of prediction error signal values is selected for said prediction block by said encoding efficiency judgement means (433), to apply said one-dimensional Discrete Sine Transform processing to said set along said horizontal direction and apply said one-dimensional Discrete Cosine Transform processing to said set along said vertical direction.

28. An inter-block interpolative prediction decoding apparatus for operating on said code generated by encoding of an image by the inter-block interpolative prediction encoding apparatus of claim 26, comprising first memory means (411, 415), and block reconversion means (451, 452) including second memory means (451), decoding means (440) for separating said prediction direction information from said code, and for decoding said code portions respectively corresponding to said independent blocks to obtain corresponding sets of decoded pixel signal values, and successively storing each of said decoded pixel signal values in said second memory means 401 and in said first memory means (411, 415), in a first stage of operation which is executed prior to decoding of said prediction blocks, and for thereafter successively decoding said code portions respectively corresponding to said prediction blocks to obtain corresponding sets of decoded prediction error signal values, adder means (170) for adding to each of said decoded prediction error signal values a corresponding predicted pixel signal value, to obtain a corresponding reconstructed pixel signal value, and interpolative prediction means (426) for reading out specific ones of said decoded pixel signal values from said first memory means (411, 415) and operating thereon to derive respective ones of said prediction pixel signal values for a prediction block by interpolation along a direction which is specified by said prediction direction information, utilizing respective decoded pixel signal values of two of said independent blocks which enclose said prediction block, and successively supplying said prediction pixel signal values to said adder means (17), wherein said block reconversion means (451, 452) is controlled by said prediction control means (426) for reading out successive ones of said stored sets of decoded pixel signal values corresponding to said independent blocks in alternation with derivation of respective sets of said reconstructed pixel signal values corresponding to said prediction blocks, in an appropriate sequence for reconstituting said image as said array of pixels.

* * * * *